(12) United States Patent
Panikkar

(10) Patent No.: US 11,799,629 B2
(45) Date of Patent: Oct. 24, 2023

(54) ACCESS AUTHORIZATION UTILIZING HOMOMORPHICALLY ENCRYPTED ACCESS AUTHORIZATION OBJECTS

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 17/501,057

(22) Filed: Oct. 14, 2021

(65) Prior Publication Data

US 2023/0123579 A1     Apr. 20, 2023

(51) Int. Cl.
| | |
|---|---|
| *H04L 9/30* | (2006.01) |
| *H04L 9/14* | (2006.01) |
| *H04L 9/00* | (2022.01) |
| *G06F 21/62* | (2013.01) |
| *H04L 9/28* | (2006.01) |

(52) U.S. Cl.
CPC .......... *H04L 9/008* (2013.01); *G06F 21/6218* (2013.01); *H04L 9/30* (2013.01)

(58) Field of Classification Search
None
See application file for complete search history.

(56) References Cited

U.S. PATENT DOCUMENTS

2022/0417007 A1* 12/2022 Zhou .................... H04L 9/0825

FOREIGN PATENT DOCUMENTS

CN     115099959 A  *  9/2022

OTHER PUBLICATIONS

Wikipedia, "Colocation Centre," https://en.wikipedia.org/wiki/Colocation_centre, Sep. 15, 2021, 3 pages.

(Continued)

*Primary Examiner* — Venkat Perungavoor
(74) *Attorney, Agent, or Firm* — Ryan, Mason & Lewis, LLP

(57) ABSTRACT

An apparatus comprises a processing device configured to determine an asset identifier for an information technology asset, to encrypt the asset identifier utilizing a public key of a first homomorphic encryption key pair, and to evaluate a first homomorphic encryption function for a first homomorphically encrypted access authorization object that takes as input the encrypted asset identifier and provides as output an encrypted access authorization identifier. The processing device is also configured to decrypt the access authorization identifier utilizing a secret key of the first homomorphic encryption key pair and, responsive to validating the access authorization identifier, to evaluate additional homomorphic encryption functions for additional homomorphically encrypted access authorization objects that return encrypted access authorization information. The processing device is further configured to decrypt the access authorization information utilizing secret keys of additional homomorphic encryption key pairs to authorize access to given functionality of the information technology asset.

20 Claims, 17 Drawing Sheets

(56) References Cited

OTHER PUBLICATIONS

S. Sinclair et al., "Dell Technologies Delivers on as-a-Service with APEX Data Storage Services," ESG White Paper, Dell Technologies, May 2021, 8 pages.
Y. Polyakov et al., "PALISADE Lattice Cryptography Library," User Manual v1.11.4, Aug. 20, 2021, 53 pages.
Palisade Project, "Palisade Homomorphic Encryption Software Library," https://palisade-crypto.org/documentation/, Accessed Oct. 13, 2021, 6 pages.

* cited by examiner

| KEY | SHARED WITH | USE |
|---|---|---|
| ORDER SECRET KEY (osk) | LICENSING AGENT | • DECRYPT ORDERING BLOB |
| ORDER PUBLIC KEY (opk) | ORDERING SYSTEM | • ENCRYPT ORDERING INFORMATION |
| LICENSE IDENTIFICATION SECRET KEY (lsk) | ALL PARTICIPANTS | • DECRYPT LICENSE IDENTIFICATION NUMBER |
| LICENSE IDENTIFICATION PUBLIC KEY (lpk) | ALL PARTICIPANTS | • ENCRYPT LICENSE IDENTIFICATION NUMBER<br>• EXECUTE "EVAL" FUNCTION TO GET THE CYPHERTEXT OUTPUT |
| MANUFACTURING SECRET KEY (msk) | LICENSING AGENT | • DECRYPT SYSTEM INFORMATION |
| MANUFACTURING PUBLIC KEY (mpk) | MANUFACTURING SYSTEM | • ENCRYPT SYSTEM INFORMATION |

```
{
    "ORDER":{
        "ORDER_NUMBER":123456,
            "LICENSE_IDENTIFICATION_NUMBER" : 987654321
        "SYSTEM":"PRODUCT_TYPE",
        "USERS" : 5
            "MEMORY"  :     500 GB
            "DISK"    :     2 TB
    }
}
```

1105

```
{
    "LICENSE":{
        "ORDER_NUMBER":123456,
        "LICENSE_IDENTIFICATION_NUMBER" : 987654321
    }
}
```

FIG. 11

```
1.   usint plaintextModulus = 536903681;
2.   double sigma = 3.2;
3.   size_t batchSize = 8;
4.   SecurityLevel = HEStd_128_classic;
5.
6.   // Generate Parameters
7.
8.   EncodingParams encodingParams(new EncodingParamsImpl(plaintextModulus, batchSize));
9.
10.  //Set Crypto Parameters and eval for returning "License Identification" from the encrypted cyphertext
11.
12.  CryptoContext<DCRTPoly> cc = CryptoContextFactory<DCRTPoly>::genCryptoContextBFVrns();
13.
14.  // enable features that you wish to use
15.  cc->Enable(ENCRYPTION);
16.  cc->Enable(SHE);
17.
18.  // Generating a secret-public keypair
19.  LPKeyPair<DCRTPoly> Opk = cc->KeyGen();
20.
21.  if( !Opk.good() ) {
22.      std::cout << "Key generation failed!" << std::endl;
23.      exit(1);
24.  }
25.  usint m = cc->GetCryptoParameters()->GetElementParams()->GetCyclotomicOrder();
26.  PackedEncoding::SetParams(m, encodingParams);
```

```
cc->EvalLicenseIdentificationKeyGen(Opk.secretKey);
```

1310

```
vector<uint64_t> v1 = { 0, 4, 6, 2, 5 };

// Convert the vectors into plaintext representation
Plaintext PT1 = cc->MakePackedPlaintext(v1);

Ciphertext<DCRTPoly> EncryptedOrder;

// Convert the plaintext representations into a ciphertexts by encrypted them using the
public key
CT1 = cc->Encrypt(kp.publicKey, PT1);

// Evaluate for the License Identification ID from encrypted File
/
Ciphertext<DCRTPoly> cypherLicenseID = cc->EvalLicenseIdentity(CT1);
```

1315

```
Plaintext LicenseID;

cc->Decrypt(kp.secretKey, cypherLicenseID , &LicenseKey);
```

FIG. 13B

ACCESS AUTHORIZATION UTILIZING HOMOMORPHICALLY ENCRYPTED ACCESS AUTHORIZATION OBJECTS

FIELD

The field relates generally to information processing, and more particularly to techniques for managing information processing systems.

BACKGROUND

Information technology infrastructure may include information technology assets deployed at customer computing sites, at colocation data centers, etc. Licensing and other access authorization for information technology assets can be a challenging task, particularly where multiple entities are responsible for licensing or other access authorization for different functions and features of the information technology assets. In some cases, an information technology asset vendor may utilize various third-party entities for manufacturing information technology assets, distributing information technology assets, hosting information technology assets, etc. Each of such third-party entities may play a role in licensing or access authorization for the information technology assets.

SUMMARY

Illustrative embodiments of the present disclosure provide techniques for access authorization utilizing homomorphically encrypted access authorization objects.

In one embodiment, an apparatus comprises at least one processing device comprising a processor coupled to a memory. The at least one processing device is configured to perform the steps of determining an asset identifier for an information technology asset, encrypting the asset identifier utilizing a homomorphic encryption public key of a first homomorphic encryption key pair, and evaluating a first homomorphic encryption function for a first one of a set of two or more homomorphically encrypted access authorization objects, the first homomorphic encryption function taking as input the encrypted asset identifier and providing as output an encrypted access authorization identifier associated with the information technology asset. The at least one processing device is also configured to perform the steps of decrypting the encrypted access authorization identifier utilizing a homomorphic encryption secret key of the first homomorphic encryption key pair and, responsive to validating the decrypted access authorization identifier, evaluating one or more additional homomorphic encryption functions for one or more additional ones of the set of two or more homomorphically encrypted access authorization objects, a given one of the one or more additional homomorphic encryption functions taking as input the access authorization identifier encrypted utilizing a given homomorphic encryption public key of a given additional homomorphic encryption key pair and providing as output encrypted access authorization information for at least a given portion of functionality of the information technology asset. The at least one processing device is further configured to perform the steps of decrypting the encrypted access authorization information utilizing a given homomorphic encryption secret key of the given additional homomorphic encryption key pair and, responsive to validating the decrypted access authorization information, authorizing access to the given portion of the functionality of the information technology asset.

These and other illustrative embodiments include, without limitation, methods, apparatus, networks, systems and processor-readable storage media.

BRIEF DESCRIPTION OF THE DRAWINGS

FIGS. 10A and 10B illustrate different sets of homomorphic encryption keys and their uses by different participants in an information technology asset ordering process in an illustrative embodiment.

FIG. 11 illustrates ordering information for an information technology asset in an illustrative embodiment.

FIGS. 13A and 13B show pseudocode for generation and utilization of homomorphic encryption keys in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
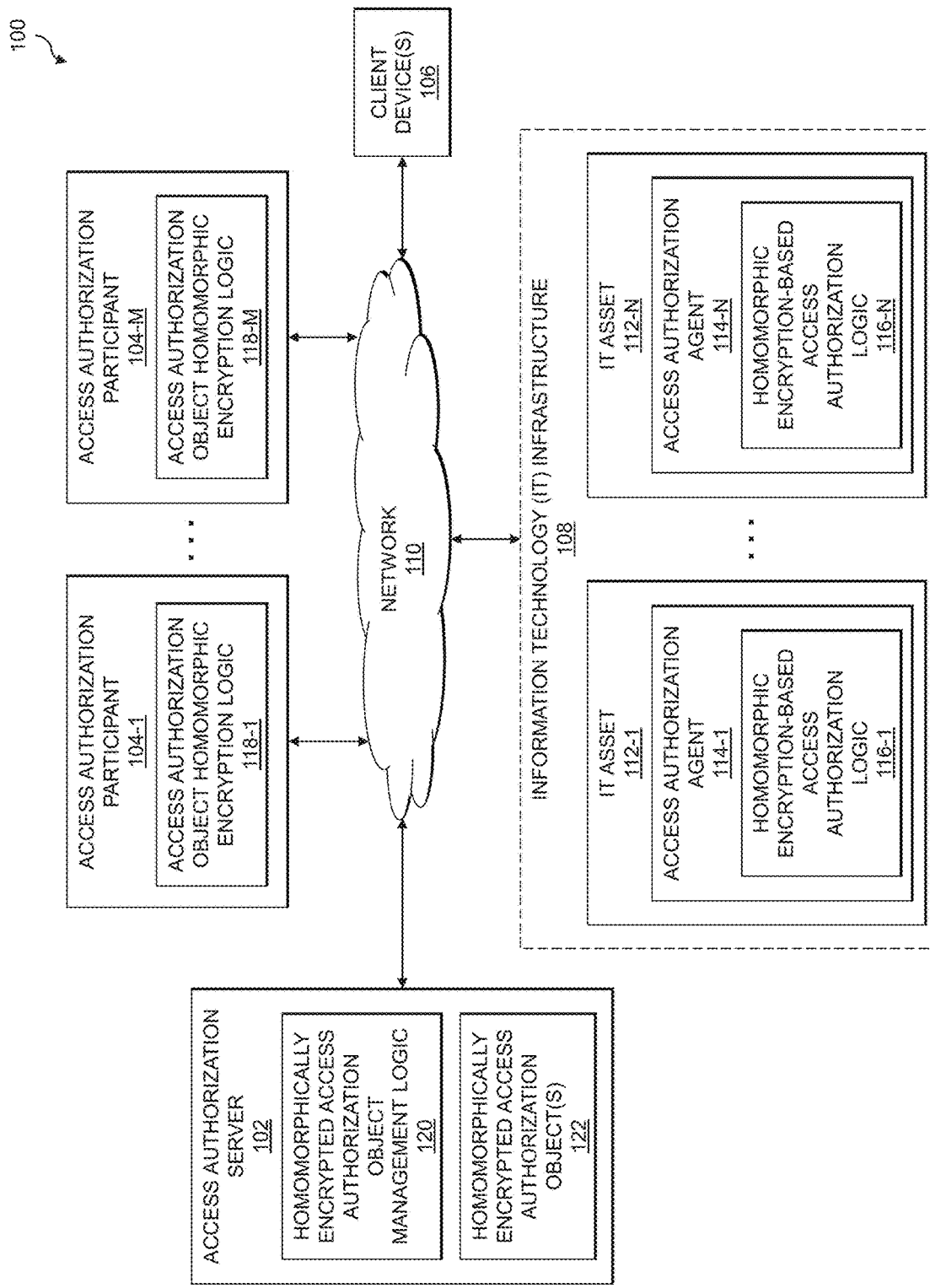
FIG. 1 is a block diagram of an information processing system configured for access authorization utilizing homomorphically encrypted access authorization objects in an illustrative embodiment.

FIG. 1 shows an information processing system 100 configured in accordance with an illustrative embodiment. The information processing system 100 is assumed to be built on at least one processing platform and provides functionality for access authorization utilizing homomorphically encrypted access authorization objects. The information processing system 100 includes an access authorization server 102, a set of access authorization participants 104-1, . . . 104-M (collectively, access authorization participants 104), one or more client devices 106, and an information technology (IT) infrastructure 108 which are coupled via a network 110. The IT infrastructure 108 is assumed to include a set of IT assets 112-1, . . . 112-N (collectively, IT assets 112). Access authorization for the IT assets 112 of the IT infrastructure 108 is managed via the access authorization server 102, in accordance with a homomorphic encryption solution described in further detail below involving access authorization objects created by the access authorization participants 104. The IT assets 112 may include, by way of example, physical and virtual computing resources. Physical computing resources may include physical hardware such as servers, storage systems, networking equipment, Internet of Things (IoT) devices, health monitoring devices or other types of wearable devices, satellite devices, other types of processing and computing devices, etc. Virtual computing resources may include virtual machines (VMs), software containers (also referred to herein as containers), etc.

The client devices 106 are assumed to access or otherwise utilize the IT assets 112 of the IT infrastructure 108. The client devices 106 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 106 may also or alternately comprise virtualized computing resources, such as VMs, containers, etc.

The client devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

In some embodiments, the IT infrastructure 108 is operated by an enterprise, and the client devices 106 are operated by users of the enterprise. The IT infrastructure 108 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the access authorization server 102, the access authorization participants 104 and/or the client devices 106. A given enterprise system may host IT assets 112 that are associated with multiple enterprises (e.g., two or more different businesses, organizations or other entities). In some embodiments, the IT infrastructure 108 may comprise an enterprise data center such as a colocation data center which hosts the IT assets 112 that are accessed by end-users of the client devices 106.

The network 110 coupling the access authorization server 102, the access authorization participants 104, the client devices 106 and the IT infrastructure 108 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the access authorization server 102, the access authorization participants 104, the client devices 106, and the IT infrastructure 108, as well as to support communication between the access authorization server 102, the access authorization participants 104, the client devices 106, the IT infrastructure 108 and other related systems and devices not explicitly shown.

In the FIG. 1 embodiment, the IT assets 112 operating in the IT infrastructure 108 are assumed to run respective access authorization agents 114-1, . . . 114-N (collectively, access authorization agents 114). The access authorization agents 114 are configured to control access to features and functionality of the IT assets 112 on which they run. It should be noted that while FIG. 1 shows the access authorization agents 114 running internal to the IT assets 112, it is possible for the access authorization agents to run at least partially external to the associated IT assets 112. Further, it is possible for a single access authorization agent 114 to be used for multiple different ones of the IT assets 112, or for a single one of the IT assets 112 to run or otherwise be associated with multiple different access authorization agents 114 (e.g., such as where different instances of the access authorization agents 114 are responsible for managing access authorization for different features and functionality of one or more of the IT assets 112).

Access authorization may include licensing of various functions or features of the IT assets 112. In some embodiments, functions or features of the IT assets 112 controlled using the access authorization agents 114 include configuration of a number of users allowed to access functions or features of the IT assets 112, configuration of designated amounts of different compute, storage and network resources that users are allowed to access on the IT assets 112, etc. The access authorization agents 114 enforce such restrictions (e.g., on the number of users, the amount of memory or storage available, etc.) on the IT assets 112. The access authorization agents 114 can further control access to software running on the IT assets 112 (e.g., whether particular software is accessible, whether different features or functions of the software are unlocked or otherwise made available for use, etc.).

To enforce access authorization policies, the access authorization agents 114 utilize respective instances of homomorphic encryption-based access authorization logic 116-1, . . . 116-N (collectively, homomorphic encryption-based access authorization logic 116). The homomorphic encryption-based access authorization logic 116 is used to access different portions of access authorization information that is stored in different access authorization objects that are generated by different ones of the access authorization participants 104. Different ones of the access authorization participants 104 are configured to generate different access authorization objects which specify information regarding the functions or features to be made available on the IT assets 112 to designated users. Such access authorization objects are then encrypted using different sets of homomorphic encryption keys which are made available to the access authorization participants 104 by an encryption key manager. The encryption key manager may be part of or associated with the access authorization server 102.

Each of the access authorization participants 104 implements a respective instance of the access authorization object homomorphic encryption logic 118-1, . . . 118-M (collectively, access authorization object homomorphic encryption logic 118), which is used for applying homomorphic encryption to access authorization objects created by the different access authorization participants 104. Different sets of homomorphic encryption keys are assumed to be provided to different ones of the access authorization participants 104. Generally, each access authorization participant 104 is assumed to be provisioned with at least one "common" homomorphic encryption key for a given IT asset 112 (e.g., IT asset 112-1) and at least one "unique" homomorphic encryption key for the given IT asset 112-1. The common homomorphic encryption key is shared with the access authorization agent 114-1 associated with the given IT asset 112-1 and each of the access authorization participants 104. A given one of the unique homomorphic encryption keys for a given one of the access authorization participants 104 (e.g., access authorization participant 104-1) is not shared with any other one of the access authorization participants 104, but is shared with the access authorization agent 114-1 associated with the given IT asset 112-1. It should be noted that in some cases a particular one of the "unique" homomorphic encryption keys may be shared among two or more of the access authorization participants 104, but is not shared with all of the access authorization participants 104.

The access authorization object homomorphic encryption logic 118 is configured to apply homomorphic encryption to the access authorization objects using the unique homomorphic encryption keys. The access authorization server 102 implements homomorphically encrypted access authorization object management logic 120 for managing the homomorphically encrypted access authorization objects 122 produced by the access authorization object homomorphic encryption logic 118 of the access authorization participants 104. Advantageously, the homomorphic encryption applied by the access authorization object homomorphic encryption logic 118 to produce the homomorphically encrypted access authorization objects 122 permits a designated function to be evaluated utilizing the common homomorphic encryption key shared among the access authorization participants 104 and the access authorization agent 114-1 for the given IT asset 112-1. The designated function returns limited portions of information stored in the homomorphically encrypted access authorization objects 122.

In some embodiments, the common homomorphic encryption key includes a homomorphic encryption key pair including a common homomorphic encryption public key and a common homomorphic encryption private or secret key. The common homomorphic encryption public key may be passed to the homomorphically encrypted access authorization objects 122, possibly in conjunction with other information (e.g., an order number, an access authorization identification number, an asset identifier, etc.) associated with the given IT asset 112-1, in order to evaluate the designated function. When the designated function is evaluated for a given one of the homomorphically encrypted access authorization objects 122, the given homomorphically encrypted access authorization object 122 will return an encrypted cyphertext. This encrypted cyphertext may be decrypted using the common homomorphic encryption private or secret key to obtain a limited portion of the access authorization information contained in the given homomorphically encrypted access authorization object 122.

Other portions of the access authorization information contained in the given homomorphically encrypted access authorization object 122 may only be obtained using a given unique homomorphic encryption key that was used to generate the given homomorphically encrypted access authorization object 122. The given unique homomorphic encryption key for the given homomorphically encrypted access authorization object 122 may also comprise an encryption key pair including a given unique homomorphic encryption public key and a corresponding given unique homomorphic encryption private or secret key. The given homomorphically encrypted access authorization object 122 may be generated or encrypted utilizing the given unique homomorphic encryption public key, and the full contents of the given homomorphically encrypted access authorization object 122 would only be accessible to a party that has the corresponding given unique homomorphic encryption private or secret key. It should be noted that a given one of the access authorization participants 104 (e.g., access authorization participant 104-1) which produced the given homomorphically encrypted access authorization object 122 (e.g., utilizing its instance of the access authorization object homomorphic encryption logic 118-1) is only required to have access to the given unique homomorphic encryption public key. The given unique homomorphic encryption private or secret key need only be provided to the access authorization agent 114-1 associated with the given IT asset 112-1, and possibly to an encryption key manager.

The access authorization server 102, as noted above, utilizes the homomorphically encrypted access authorization object management logic 120 to manage the homomorphically encrypted access authorization objects 122 created by the different access authorization participants 104. This may include, for example, providing the homomorphically encrypted access authorization objects 122 to different ones of the access authorization participants 104 and/or the access authorization agents 114 associated with the IT assets 112 as requested. In some embodiments, the homomorphically encrypted access authorization object management logic 120 is configured to receive requests (e.g., from the access authorization participants 104 and/or access authorization agents 114) to evaluate designated homomorphic encryption functions which return limited portions of the access authorization information contained in the homomorphically encrypted access authorization objects 122, as described above and elsewhere herein. The homomorphically encrypted access authorization object management logic 120 provides such limited portions of the access authorization information back to the requesters, where the limited portions of the access authorization information may be provided to the requesters in encrypted form and which may be decrypted using the common homomorphic encryption private or secret key. Certain requesters with access to the relevant unique homomorphic encryption private or secret keys can obtain the full information that is contained in the homomorphically encrypted access authorization objects 122.

Consider, as an example, where a first one of the access authorization participants 104 (e.g., access authorization participant 104-1) is associated with a vendor's ordering system that receives an order for a given IT asset (e.g., IT asset 112-1) that is to be manufactured or produced on behalf of the vendor by a second one of the access authorization participants 104 (e.g., access authorization participant 104-2). The access authorization participant 104-1 may create a first access authorization object with various order information for the given IT asset 112-1, including an order number, a license or access authorization identification number, and order details (e.g., specifications of the features and functions to be made available on the given IT asset 112-1, such as amounts of memory and storage, number of users, etc.). The access authorization participant 104-1 generates an encrypted first access authorization object using its instance of the access authorization object homomorphic encryption logic 118-1, with the encrypted first access authorization object being stored as one of the homomorphically encrypted access authorization objects 122 by the access authorization server 102. In this example, the designated function when evaluated against the encrypted first access authorization object (e.g., by a party supplying the order number for the given IT asset 112-1, which may be encrypted using the common homomorphic encryption public key) returns the license or access authorization identification number, in encrypted form.

The second access authorization participant 104-2 may evaluate the designated function on the encrypted first access authorization object (e.g., by passing the order number, which may be encrypted using the common homomorphic encryption public key) to get the license or access authorization identification number back, again in encrypted form. The second access authorization participant 104-2, which is assumed to be provisioned with the common homomorphic encryption private or secret key, can obtain the license or access authorization identification number in plaintext. The second access authorization participant 104-2 creates a second access authorization object with various system detail information for the given IT asset 112-1, including an asset identifier for the given IT asset 112-1 (which may not be known to the access authorization participant 104-1 at the time the order is placed and the first access authorization object is created). The second access authorization participant 104-2 uses its instance of the access authorization object homomorphic encryption logic 118-2 to encrypt the second access authorization object, which is also stored as one of the homomorphically encrypted access authorization objects 122 managed by the access authorization server 102 using homomorphically encrypted access authorization object management logic 120. In this example, the designated function when evaluated against the encrypted second access authorization object (e.g., by a party supplying the asset identifier for the given IT asset 112-1, which may be encrypted using the common homomorphic encryption public key) returns the license or access authorization identification number for the given IT asset 112-1, in encrypted form.

Various additional ones of the access authorization participants 104 (e.g., access authorization participants 104-3, . . . 104-M) are assumed to create additional access authorization objects which contain other access authorization information. For example, one or more additional ones of the access authorization participants 104 may be associated with software vendors providing software that is to be made available for use on the given IT asset 112-1.

In order to unlock functions or features of the given IT asset 112-1, its associated access authorization agent 114-1 utilizes its instance of the homomorphic encryption-based access authorization logic 116-1 to read information from the first and second encrypted access authorization objects created by the first and second access authorization participants 104-1 and 104-2. The access authorization agent 114-1 is assumed to be provisioned with or have access to the unique homomorphic encryption private or secret keys necessary to obtain the ordering information and the system details that are stored in the first and second access authorization objects. To find the relevant ones of the homomorphically encrypted access authorization objects 122, the homomorphic encryption-based access authorization logic 116-1 may read an asset identifier from the given IT asset 112-1, and then pass that asset identifier (e.g., in encrypted form using the common homomorphic encryption public key) to the access authorization server 102, which will use the homomorphically encrypted access authorization object management logic 120 to search among the homomorphically encrypted access authorization objects 122 (e.g., by passing the encrypted asset identifier to a designated homomorphic encryption function) to see if any return a match with an associated license or access authorization identification number. This may be used in turn to search other homomorphically encrypted access authorization objects 122 to obtain order information (e.g., to determine what features and functionality should be authorized for the given IT asset 112-1).

In some embodiments, access authorization information (e.g., the homomorphically encrypted access authorization objects 122, sets of homomorphic encryption keys, etc.) may be stored in a database or other data store. The database or other data store may be implemented using one or more of storage systems that are part of or otherwise associated with the access authorization server 102. In some embodiments, the database or other data store may be external to the access authorization server 102, and may be implemented within one or more of the access authorization participants 104, the client devices 106, and the IT infrastructure 108. Further, in some embodiments different portions of the access authorization information may be stored in separate databases or other data stores in distinct locations. For example, homomorphic encryption keys may be stored at an encryption key manager, which may be external to the access authorization server 102, while the homomorphically encrypted access authorization objects 122 are stored within the access authorization server 102. As another example, at least a portion of the homomorphically encrypted access authorization objects 122 may be stored external to the access authorization server 102. Different ones of the homomorphically encrypted access authorization objects 122 may also be stored in different databases or other data stores at the same or different locations.

The storage system implementing the databases or other data stores in which the access authorization information is stored may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the access authorization server 102, the access authorization participants 104, and the IT assets 112 in the FIG. 1 embodiment, the homomorphic encryption-based access authorization logic 116, the access authorization object homomorphic encryption logic 118 and the homomorphically encrypted access authorization object management logic 120 may in other embodiments be implemented at least in part external to the access authorization server 102, the access authorization participants 104, and the IT assets 112, for example, as part of stand-alone servers, sets of servers or other types of systems coupled via one or more networks to the access authorization server 102, the access authorization participants 104, and the IT assets 112.

The access authorization server 102, the access authorization participants 104, the client devices 106 and the IT infrastructure 108 in the FIG. 1 embodiment are assumed to be implemented using at least one processing device. Each such processing device generally comprises at least one processor and an associated memory, and implements at least a portion of the functionality of the various logic described herein.

It is to be appreciated that the particular arrangement of the access authorization server 102, the access authorization participants 104, the client devices 106 and the IT infrastructure 108 illustrated in the FIG. 1 embodiment is presented by way of example only, and alternative arrangements can be used in other embodiments. For example, in some cases the access authorization server 102, the access authorization participants 104, the client devices 106 and/or the IT infrastructure 108 may be co-located. As another example, the access authorization agents 114 may be implemented at least in part external to the IT assets 112. At least portions of the homomorphic encryption-based access authorization logic 116, the access authorization object homomorphic encryption logic 118, and the homomorphically encrypted access authorization object management logic 120 may be implemented at least in part in the form of software that is stored in memory and executed by a processor.

It is to be understood that the particular set of elements shown in FIG. 1 for access authorization utilizing homomorphically encrypted access authorization objects is presented by way of illustrative example only, and in other embodiments additional or alternative elements may be used. Thus, another embodiment may include additional or alternative systems, devices and other network entities, as well as different arrangements of modules and other components.

The access authorization server 102, the access authorization participants 104, the client devices 106 and the IT infrastructure 108 and other portions of the system 100, as described above and in further detail below, may be part of cloud infrastructure.

The access authorization server 102, the access authorization participants 104, the client devices 106 and the IT infrastructure 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The access authorization server 102, the access authorization participants 104, the client devices 106 and the IT infrastructure 108, or components thereof, may be implemented on respective distinct processing platforms, although numerous other arrangements are possible. For example, in some embodiments at least portions of the access authorization server 102, the access authorization participants 104, and the IT infrastructure 108 are implemented on the same processing platform. Further, one or more of the client devices 106 can be implemented at least in part within at least one processing platform that implements at least a portion of the access authorization server 102, the access authorization participants 104, and the IT infrastructure 108.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the access authorization server 102, the access authorization participants 104, the client devices 106 and the IT infrastructure 108, or portions or components thereof, to reside in different data centers. Numerous other distributed implementations are possible.

Additional examples of processing platforms utilized to implement the access authorization server 102, the access authorization participants 104, the client devices 106 and the IT infrastructure 108 and other components of the system 100 in illustrative embodiments will be described in more detail below in conjunction with FIGS. 14 and 15.

It is to be appreciated that these and other features of illustrative embodiments are presented by way of example only, and should not be construed as limiting in any way.

An exemplary process for access authorization utilizing homomorphically encrypted access authorization objects will now be described in more detail with reference to the flow diagram of FIG. 2. It is to be understood that this particular process is only an example, and that additional or alternative processes for access authorization utilizing homomorphically encrypted access authorization objects may be used in other embodiments.

In this embodiment, the process includes steps 200 through 212. These steps are assumed to be performed utilizing the homomorphic encryption-based access authorization logic 116, the access authorization object homomorphic encryption logic 118, and the homomorphically encrypted access authorization object management logic 120. The process begins with step 200, determining an asset identifier for an IT asset. The asset identifier is encrypted in step 202 utilizing a homomorphic encryption public key of a first homomorphic encryption key pair. In step 204, a first homomorphic encryption function for a first one of a set of two or more homomorphically encrypted access authorization objects is evaluated. The first homomorphic encryption function takes as input the encrypted asset identifier and provides as output an encrypted access authorization identifier associated with the IT asset. The first homomorphic encryption key pair is shared with access authorization participants generating the set of two or more homomorphically encrypted access authorization objects.

In step 206, the encrypted access authorization identifier is decrypted utilizing a homomorphic encryption secret key of the first homomorphic encryption key pair. Responsive to validating the decrypted access authorization identifier, one or more additional homomorphic encryption functions for one or more additional ones of the set of two or more homomorphically encrypted access authorization objects are evaluated in step 208. A given one of the one or more additional homomorphic encryption functions takes as input the access authorization identifier encrypted utilizing a given homomorphic encryption public key of a given additional homomorphic encryption key pair and provides as output encrypted access authorization information for at least a given portion of functionality of the IT asset. The given additional homomorphically encrypted access authorization object is homomorphically encrypted by a given access authorization participant utilizing the given homomorphic encryption public key of the given additional homomorphic encryption key pair. The given homomorphic encryption secret key of the given additional homomorphic encryption key pair is not provided to the given access authorization participant.

The encrypted access authorization information is decrypted in step 210 utilizing a given homomorphic encryption secret key of the given additional homomorphic encryption key pair. Responsive to validating the decrypted access authorization information, access to the given portion of the functionality of the IT asset is authorized in step 212. The access authorization information stored in the given additional homomorphically encrypted access authorization object may comprises a designated number of users permitted to concurrently access the IT asset, and step 212 may comprise limiting a number of users concurrently accessing the IT asset to the designated number of users. The access authorization information stored in the given additional homomorphically encrypted access authorization object may specify designated amounts of one or more compute, storage, memory and network resources of the IT asset that are permitted to be accessed by one or more designated users, and step 212 may comprise permitting the one or more designated users to access the designated amounts of the one or more compute, storage, memory and network resources of the information technology asset. The access authorization information stored in the given additional homomorphically encrypted access authorization object may specify one or more designated portions of functionality of one or more pieces of software installed on the IT asset that are permitted to be accessed by one or more designated users, and step 212 may comprise permitting the one or more designated users to access the one or more designated portions of the functionality of the one or more pieces of software.

Figure 2:
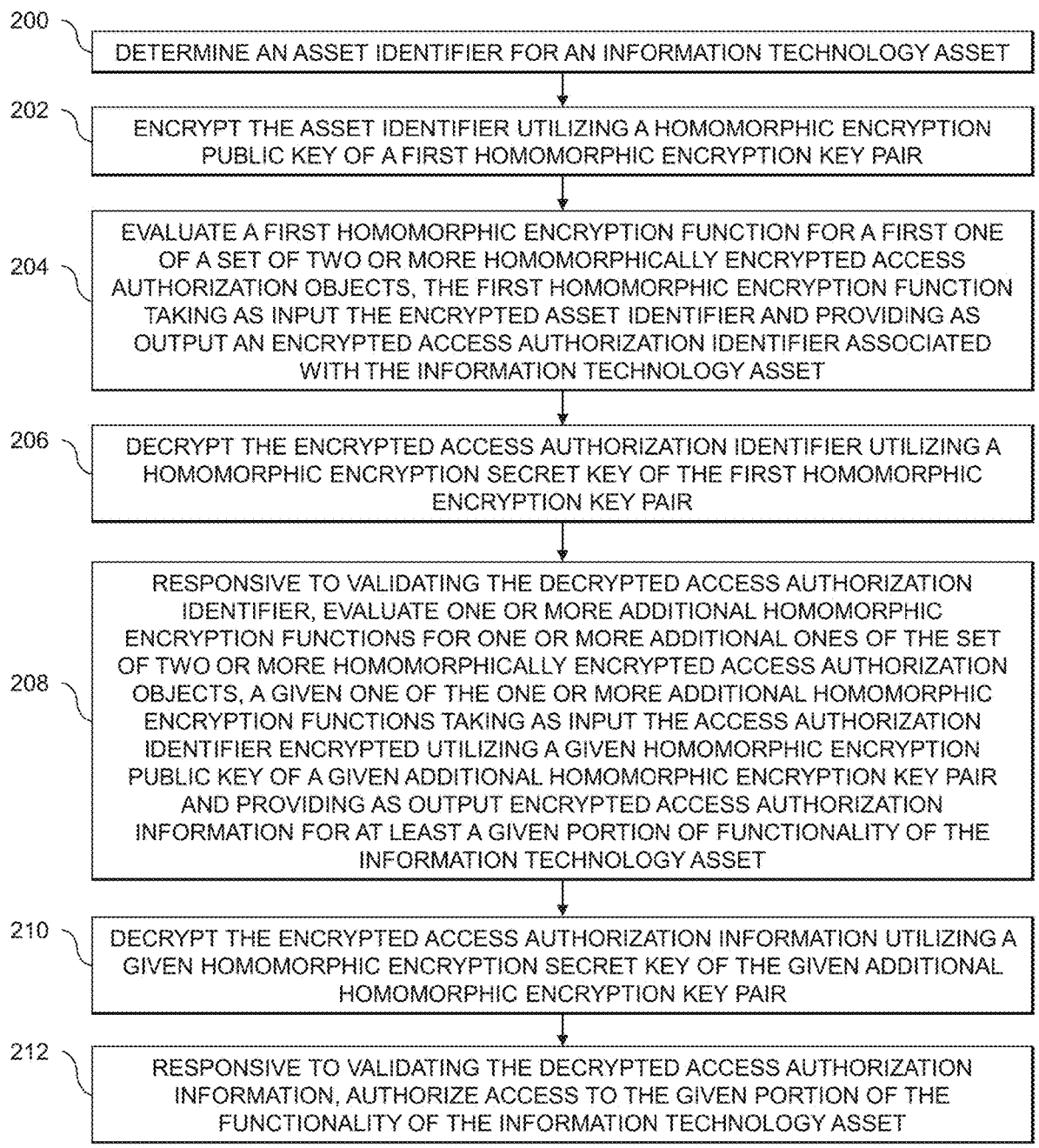
FIG. 2 is a flow diagram of an exemplary process for access authorization utilizing homomorphically encrypted access authorization objects in an illustrative embodiment.

The FIG. 2 process may be performed by an access authorization agent associated with the IT asset, and the first and one or more additional homomorphically encrypted access authorization objects may be stored in a storage system external to the IT asset or a processing device that runes the access authorization agent. The storage system may be part of a cloud-based computing platform. The IT asset may run in a colocation data center operated by an entity, and the set of two or more homomorphically encrypted access authorization objects may be utilized for authorizing access to the IT asset running in the colocation data center by one or more end-users operating outside of the colocation data center.

In some embodiments, the first homomorphically encrypted access authorization object is generated by a first access authorization participant that manufactures the IT asset on behalf of a second access authorization participant. The first homomorphically encrypted access authorization object may store system details of the IT asset manufactured by the first access authorization participant. The given additional homomorphically encrypted access authorization object may be generated by the second access authorization participant. The second access authorization participant may comprise a vendor that receives an order for the IT asset, and the access authorization information stored in the given additional homomorphically encrypted access authorization object may comprise order information specifying functionality to be provided by the IT asset.

In the current digital world, the importance of data security is growing day by day. Personally identifiable information (PII), for example, is often encrypted at transmission as well as at storage. Encryption algorithms are becoming stronger, and approaching a level where the encryption is considered "unbreakable" (e.g., because to do so would require so much processing power that it makes the process of breaking the encryption too costly and time-consuming to be feasible). Such encryption algorithms, however, also make it impossible to process the data without first decrypting it—and decrypting the data leaves it vulnerable to hackers and other malicious actors.

While stronger encryption makes data more secure, this lowers flexibility for reading and editing the data (or portions thereof) after encryption. The only way to read and edit the data is to decrypt it, perform any necessary addition and/or computation, and re-encrypt it. Consider, as an example, license key file generation for assets (e.g., products) that are provided by an entity (e.g., a vendor) to end-users. The most modern encryption algorithms may be utilized for license key file generation, but this leads to a loss of flexibility in handling license key file content (e.g., the data must be decrypted, have changes applied to it, and be re-encrypted) and gives a loophole or attack vector to potential malicious actors to get hold of the decrypted content in license key files.

As a more specific example, consider a system (e.g., a Dell PowerEdge® Server) that is ordered by a customer. Assume that the customer orders the system for 4 users, with 1000 terabytes (TB) of storage and 500 gigabytes (GB) of memory. For generating an enterprise license key for the system, a service tag or other type of machine identifier is required. At the time the order is downloaded to or otherwise provided to a manufacturer, however, the machine identifier of the system may not be available. As such, the license key for the system cannot be created at the time of providing the order to the manufacturer. Conventional approaches for handling this situation including performing upfront encryption and providing a license key file generation utility to the manufacturer (e.g., to the factory that will manufacture the system).

For upfront encryption, the license key file is created and the machine identifier is set to a dummy value (e.g., because, at the time of ordering, it is assumed that the licensing system does not know what the machine identifier will be). The license key file is encrypted and sent to the factory. A private key is given to the factory, and once the system is manufactured and assigned a machine identifier, the factory utilizes the private key to decrypt the license key file, replace the dummy machine identifier with the actual machine identifier, re-encrypt the license key file, and add the re-encrypted license key file to the system.

In an approach which gives the license key file generation utility to the factory, all information that is needed to create the license key is passed to the factory and the factory generates the license key file using the license key file generation utility. The license key file is added to the system when manufactured at the factory. Once the system reaches the customer location and boots up, a licensing agent running in the system will decrypt the license key file and unlock what the customer ordered. In the above example, the customer will be allowed to use up to 4 users, 1000 TB of space, and 500 GB of memory for the system.

Both of such conventional approaches have various drawbacks. In the upfront encryption approach, the vendor is giving the private key to the factory (e.g., an original design manufacturer (ODM)), which is a third-party entity. There can be a potential threat of the factory being hacked, which can compromise the private key. In the approach where the license key file generation utility is provided to the factory or ODM, the vendor gives the whole key generator to the factory or ODM, which is more of an issue with respect to security—if the key generator reaches the wrong hands, it can be misused in many ways.

Cloud licensing (e.g., for Infrastructure-as-a-Service (IaaS) solutions such as Dell APEX) presents additional challenges. For cloud licensing, a vendor may host servers, storage and other assets in colocation centers for customer or other end-user use. This enables such customers or other end-users to try and buy IaaS and other types of products offered by the vendor. In such use cases, the same license keys need to be re-used for different customers or other end-users as per the subscription terms. Thus, in cloud environments there is a need for more secure license key generation and distribution, as well as license updates.

Illustrative embodiments provide techniques for handling these and other issues with conventional approaches, using distributed homomorphic encryption for license key file generation and distribution for servers, storage appliances and other types of IT assets. Such IT assets may be offered in cloud computing environments, in accordance with various licensing models including a "served" license model. The served license model is a type of electronic licensing model, which is itself a type of access authorization model. The served license model is an application-based license model which is defined according to the license server that manages the allocation of licenses. The served license model is dependent on the availability of the license server, and if the license server goes down the license will be released to a license pool. This is contrasted with an "unserved" license model which is a host-based license model, in which the physical address or other characteristics of host devices are used to generate host-specific licenses prior to use. In a "classic" license model, features of software or another type of product are encrypted and the license is stored as license keys in host devices. The license key can be used for multiple installations of the software or other product.

Homomorphic encryption enables a user to perform meaningful computations on sensitive data while ensuring the privacy of the data. This may sound paradoxical to anyone who has ever worked with encrypted data before, as typically if one wants to perform useful computations on the encrypted data (e.g., encrypted under classical algorithms like advanced encryption standard (AES) algorithms) it must be decrypted first. Once decryption takes place, however, the privacy of the data is compromised. Besides traditional encryption (e.g., \mathsf{Enc}Enc), decryption (e.g., \mathsf{Dec}Dec) and key generation (e.g., \mathsf{Keygen}Keygen) algorithms, a homomorphic encryption scheme also uses an evaluation algorithm (e.g., \mathsf{Eval}Eval). This is the distinguishing feature that makes computations on encrypted data possible. The "Eval" algorithm helps to read the data from an encrypted object without decrypting the encrypted object.

Figure 3:
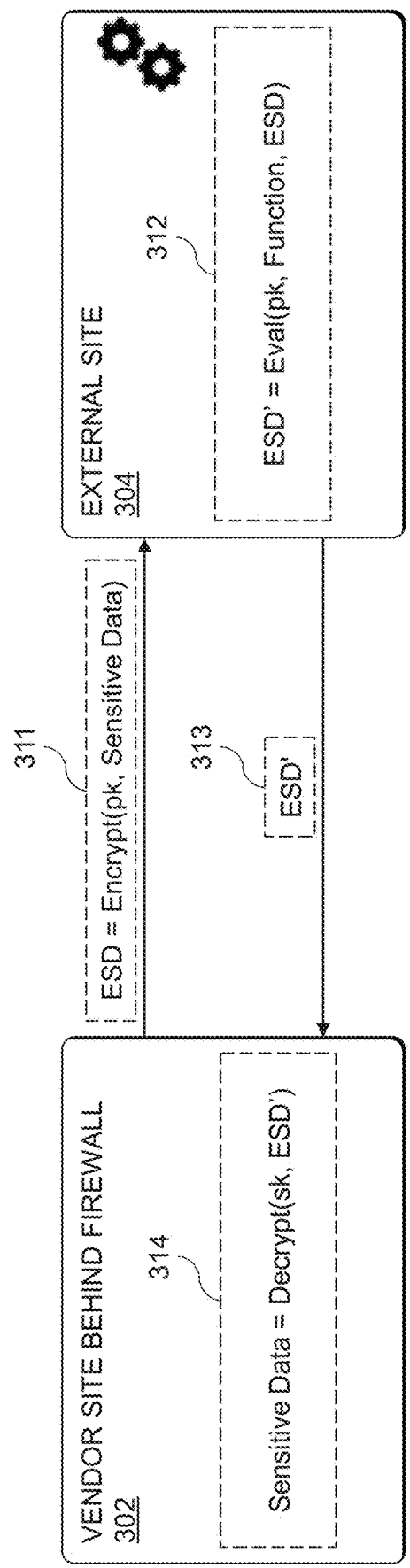
FIG. 3 shows a system flow for application of homomorphic encryption for communications between a vendor site and an external site in an illustrative embodiment.

FIG. 3 illustrates a homomorphic encryption approach applied between a vendor site 302 (e.g., that is behind a firewall) and an external site 304. The vendor site 302 may be operated by a vendor of IT assets, with the external site 304 being operated by a manufacturer, factory or ODM that manufactures or otherwise creates such IT assets on behalf of the vendor. In step 311, encrypted sensitive data (ESD) is provided from the vendor site 302 to the external site 304. The ESD is produced by encrypting the sensitive data using a public key (pk), according to ESD=Encrypt(pk, Sensitive Data). At the external site 304, a modified version of the ESD, denoted ESD', is produced in step 312. This modification is produced through the use of the "Eval" function noted above, according to ESD'=Eval(pk, Function, ESD). In step 313, the external site 304 provides ESD' back to the vendor site 302. The vendor site 302 is able to obtain the sensitive data by applying a decryption operation to ESD' using a secret key (sk) in step 314, according to Sensitive Data=Decrypt(sk, ESD'). In the FIG. 3 example, the vendor (operating at the vendor site 302 behind a firewall) sends sensitive data which has been encrypted using pk outside the firewall, so that the external site 304 never learns anything about the sensitive data. The vendor or another entity, however, can perform some computations on the encrypted data and get the value back using the "Eval" algorithm at the external site 304 using pk. The vendor at the vendor site 302 is able to decrypt the modified data (ESD') using sk to get the sensitive data back.

Consider, as an example use case, license key generation and distribution in cloud computing environments. When an order is downloaded or otherwise provided from a vendor to a factory or ODM for manufacturing, a licensing system of the vendor is not aware of the machine identifier of the IT asset for which a license is need (e.g., because the IT asset is not yet manufactured, and system details are not available). As discussed above, conventional approaches such as upfront encryption and providing a license key file generation utility to the factory have various security disadvantages.

Figure 4:
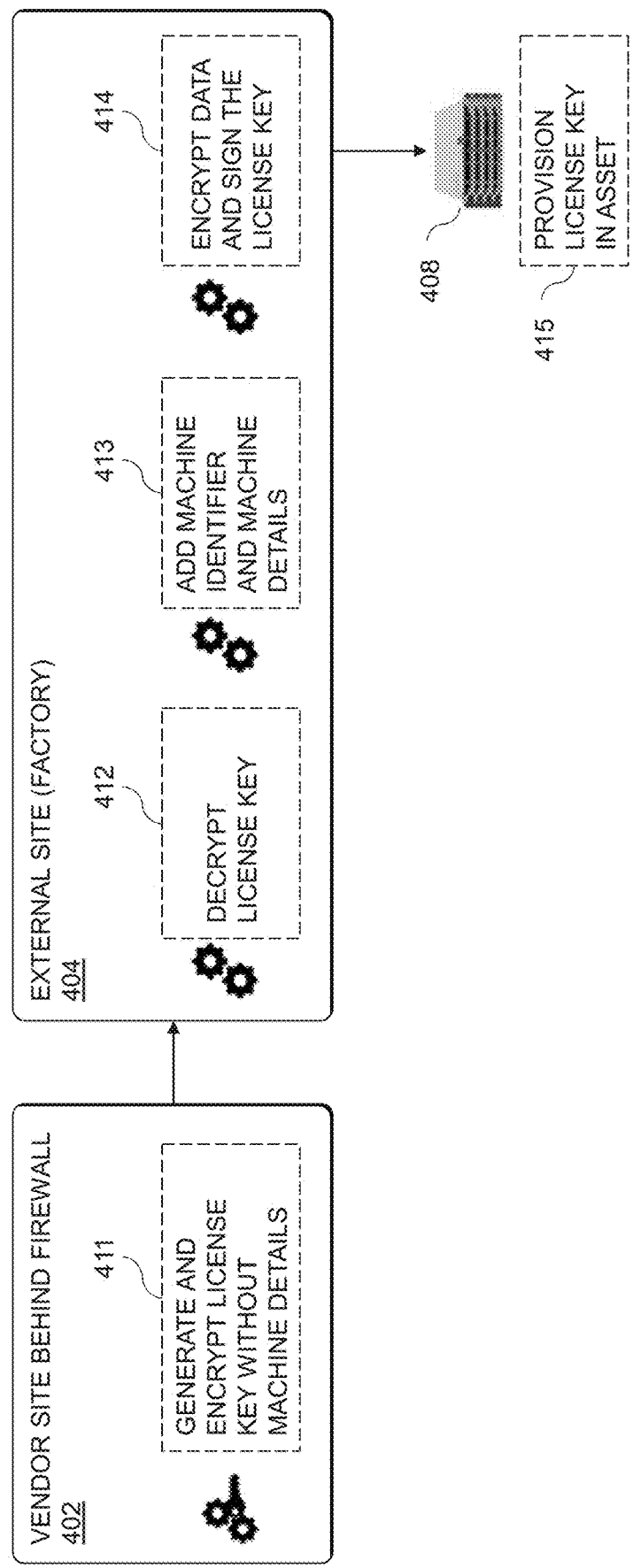
FIG. 4 shows a licensing system flow for upfront encryption between a vendor site and an external site in an illustrative embodiment.

FIG. 4 illustrates the upfront encryption approach, where there is an order for an IT asset 408. The order information for the IT asset 408 includes: 5 users, 500 GB memory, and 2 TB of data, where usage is restricted to a particular machine identifier (e.g., "ABCDE"). The vendor operating at vendor site 402 (e.g., behind a firewall) generates and encrypts a license key file without having the machine identifier details in step 411. The encrypted license key is then sent from the vendor site 402 to an external site 404 (e.g., a factor or ODM), which decrypts the license key in step 412 (e.g., using a key that is provided to the external site 404). In step 413, the external site 404 adds a machine identifier (e.g., "ABCDE") and machine details (e.g., 5 users, 500 GB memory, 2 TB data, etc.) to the license key file. The license key file is then re-encrypted and signed in step 414. In step 415, the license key file is provisioned in the IT asset 408. Provisioning the license key may include burning the license key to a read-only memory (ROM) or otherwise saving the license key in the IT asset 408. The IT asset 408 can read the license key file (e.g., using a licensing agent running on the IT asset 408), and enforce the license for what the end-user of the IT asset 408 procured from the vendor.

Figure 5:
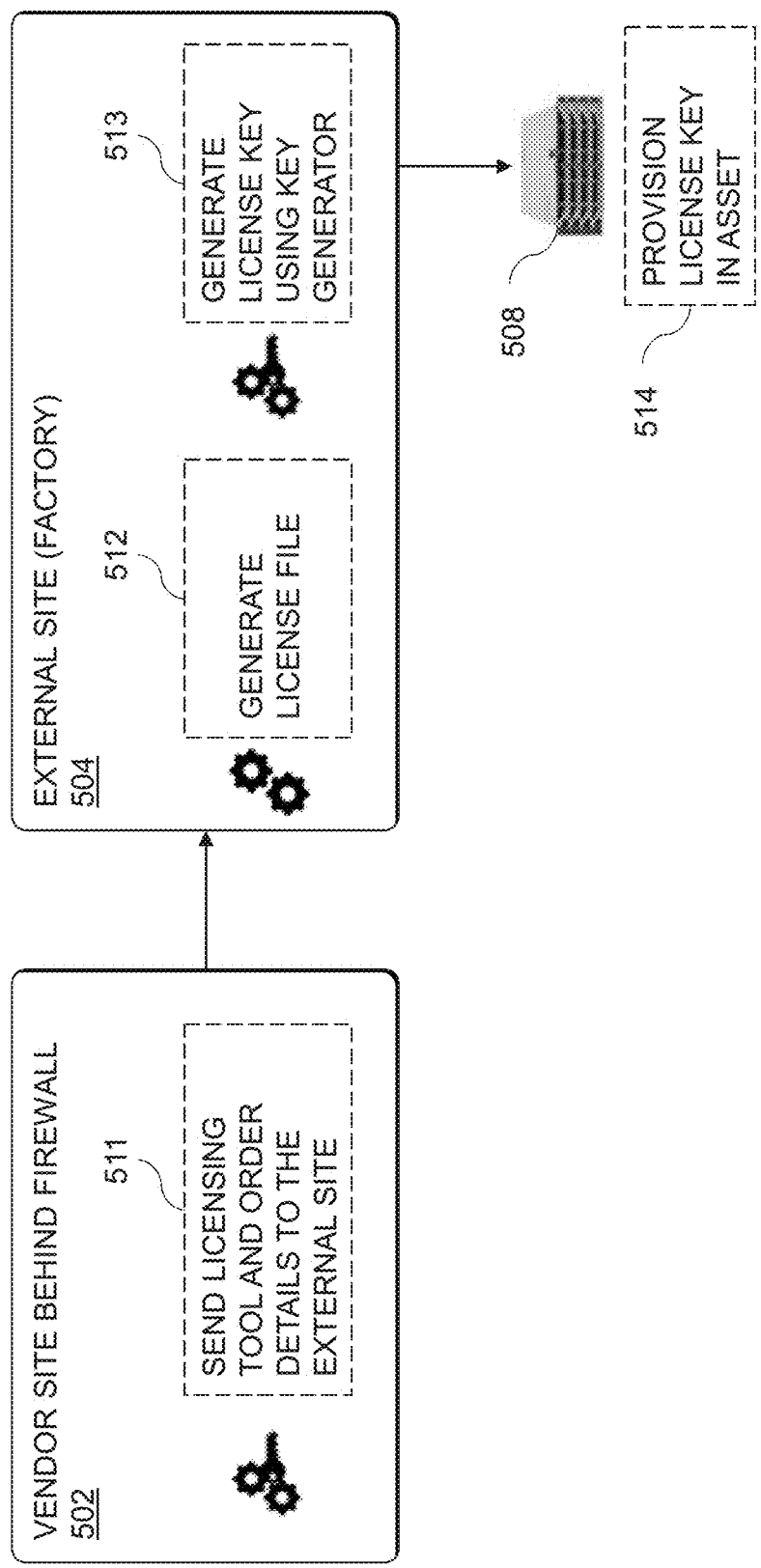
FIG. 5 shows a licensing system flow for providing a license key file generator from a vendor site to an external site in an illustrative embodiment.

FIG. 5 illustrates the approach where the license key file generator is provided to the factory or ODM. Again, it is assumed that there is an order for an IT asset 508. The order information for the IT asset 508 includes: 5 users, 500 GB memory, and 2 TB of data, where usage is restricted to a particular machine identifier (e.g., "ABCDE"). The vendor operating at vendor site 502 (e.g., behind a firewall) sends a licensing tool (e.g., a license file generator and a license key generator) and order details to the external site 504 in step 511. In step 512, the external site 504 generates the license file using the licensing tool. In step 513, the external site 504 generates the license key using the license key generator. The license key is then provisioned in the IT asset 508 in step 514. The IT asset 508 can read the license key (e.g., using a licensing agent running on the IT asset 508), and enforce the license for what the end-user of the IT asset 508 procured from the vendor.

Once a final license key is generated, the final license key may be added to a license or key manager (e.g., which may operate in a cloud computing environment that is under the control of or otherwise associated with the vendor). A managed service team (e.g., for IaaS orders such as in Dell APEX) or a customer or end-user (e.g., for normal orders) will download the final license key from the vendor and install it manually. Each addition to a given license key (e.g., such as in the case where the customer asks for an additional 1 TB of storage and 2 additional users) yields a new license key that is generated and pushed to the license manager. The managed service team or the customer or other end-user needs to download the new license key and manually re-install the new license key for making available the new features that the customer or other end-user has asked for.

Figure 6:
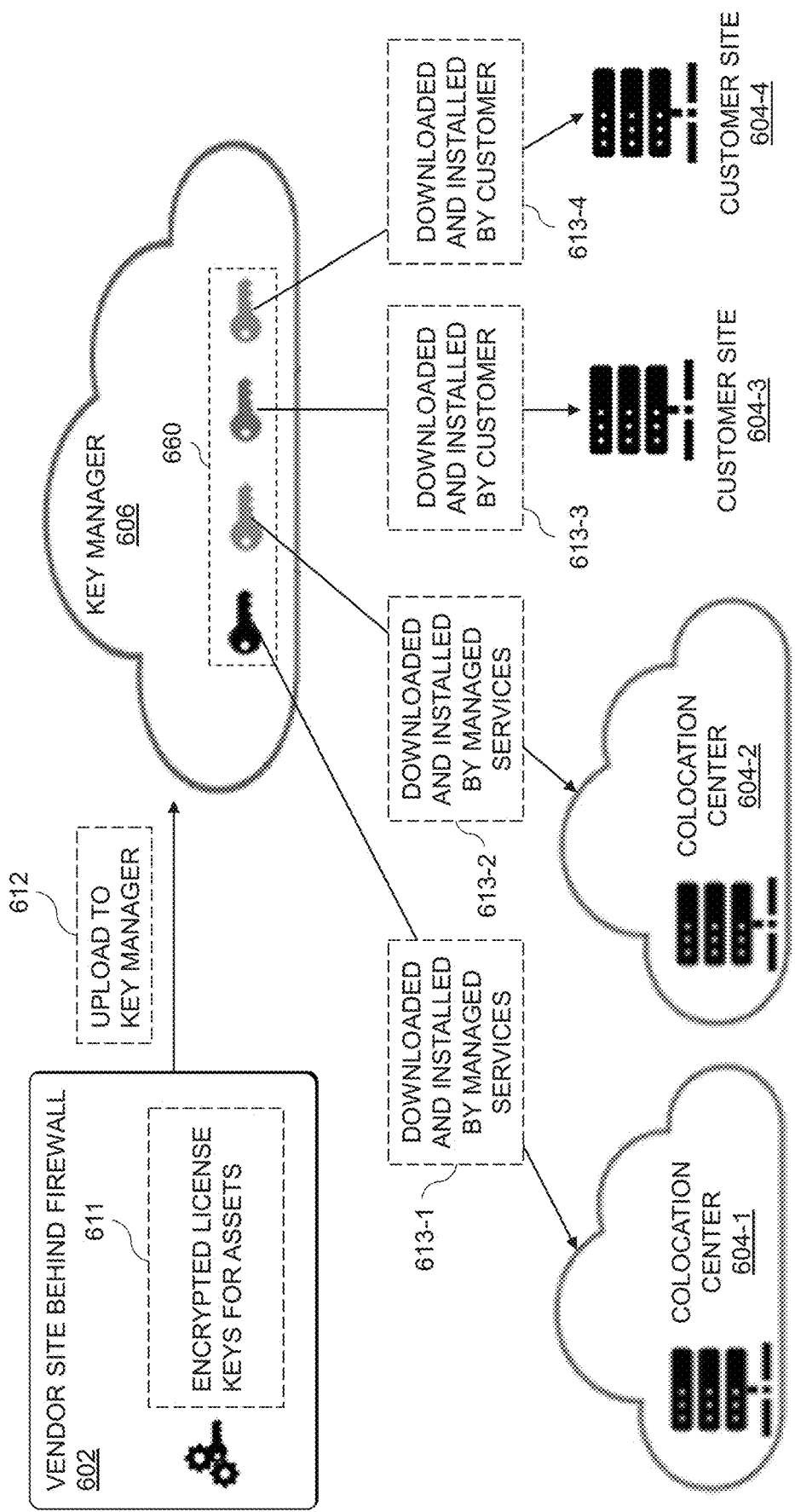
FIG. 6 shows cloud-based management of encrypted license keys in an illustrative embodiment.

FIG. 6 illustrates the vendor at the vendor site 602 (e.g., behind a firewall) which creates encrypted license keys for IT assets in step 611, and which uploads such encrypted license keys to a cloud-based license or key manager 606 in step 612. Managed services teams operating at colocation centers 604-1 and 604-2 will download and install license keys 660 from the key manager 606 in step 613-1 and 613-2. Similarly, customers or other end-users at customer sites 604-3 and 604-4 will download and install license keys 660 from the key manager in steps 613-3 and 613-4.

As detailed above, conventional approaches (e.g., requiring a vendor or service provider to pass license private keys or an entire license key generator to an external entity, such as a manufacturer, ODM or merge center) for license key generation of various IT assets (e.g., enterprise products like servers, storage, etc.) suffer from various potential security issues or misuse of license keys. For cloud-based served licensing (e.g., where customers or other end-users will check out licenses from the cloud, use them, and check them back in), a vendor or other service provider uploads license keys to a license manager (e.g., operating in a cloud computing environment, such as a private cloud operated by the vendor or other service provider). Whenever a customer needs to upgrade the license, this requires a total replacement of the old license key with a new one. This requires manual intervention by a customer or other end-users, or a managed service team of the vendor or other service provider. Further, managing license key generators with versions for different products leads to significant overhead.

The license key contains encrypted information about what type of IT asset a customer or other end-user has purchased or ordered from a vendor, and the machine details where the IT asset is supposed to run. Licensing agents (e.g., implemented as a background software service) in the servers, storage or other IT assets being licensed are configured to decrypt license keys and understand what the customer or other end-user has purchased for which IT assets. Once the licensing agents read this information, the licensing agents unlock customer or other end-user purchased functionality in the IT assets. Say an end-user is ordering a storage system for 5 users, with 500 GB memory and 2 TB disk, where the storage system carries a machine identifier of "FGHIJ". The licensing agent (e.g., a Dell Common Licensing Platform (CLP)) present in the storage system will read this information from a license key, and check if the machine identifier of the storage system matches that of the license key. If so, the license agent will unlock 500 GB of memory and 2 TB of disk space in the storage system. As discussed above, the license key file needs to be decrypted in multiple places, which may lead to compromise or misuse of the license key file.

In some embodiments, an approach is utilized which does not rely on license key files. An ordering system, for example, may encrypt ordering information (e.g., 500 GB memory, 2 TB disk, an order number) along with a unique licensing identifier, and create an access authorization object, referred to as an "Ordering Blob," which is kept accessible to the manufacturer or ODM. The ODM reads the encrypted "Ordering Blob" to get only the order number and unique identifier without decrypting the "Ordering Blob." The ODM cannot see any other customer purchased information, and cannot modify such information. Once the ODM manufactures the IT asset and assigns a machine identifier, the ODM creates another encrypted access authorization object, referred to as a "System Blob," which contains the order number, the unique licensing identifier, the machine identifier, as well as other optional information (e.g., such as the product serial number tag (PSNT) and other critical system components that are being shipped). In this way, it is possible to add "N" number of external entities participating in the manufacturing process which are enabled to create their own objects (e.g., each including the order number and unique licensing identifier). All of such objects are accessible to the licensing agent (e.g., Dell CLP) at the customer or end-user location. The licensing agent first gets a machine identifier from a current IT asset (e.g., a server, storage system, etc.) and queries against various encrypted objects to get the unique licensing identifier. Then all other details are obtained (e.g., from various objects, including the "Ordering Blob" and the "System Blob" described above) to get additional details (e.g., 500 GB memory, 2 TB disk, etc.) that are authorized. The licensing agent can then unlock such features on the IT asset.

With the above-described approach, none of the "external" entities need to decrypt the encrypted information. Even if a hacker or other malicious actor manages to decrypt one access authorization object, that malicious actor is unable to get information from any other encrypted access authorization object. In other words, compromise of one encrypted access authorization object's information is useless for compromising other encrypted access authorization objects. Thus, increased security is provided. Further, any upgrade will only need to update the corresponding encrypted access authorization object, so the licensing agent can read the encrypted access authorization object with the new information and act accordingly (e.g., say the customer wants an additional 1 TB of storage, and the ordering system can update the encrypted "Ordering Blob" to specify that the disk space is 2+1=3 TB). Further, there is no overhead of maintaining different key generators for different products. Customized homomorphic encryption (HE) will help to compute over the encrypted access authorization objects.

Figure 7:
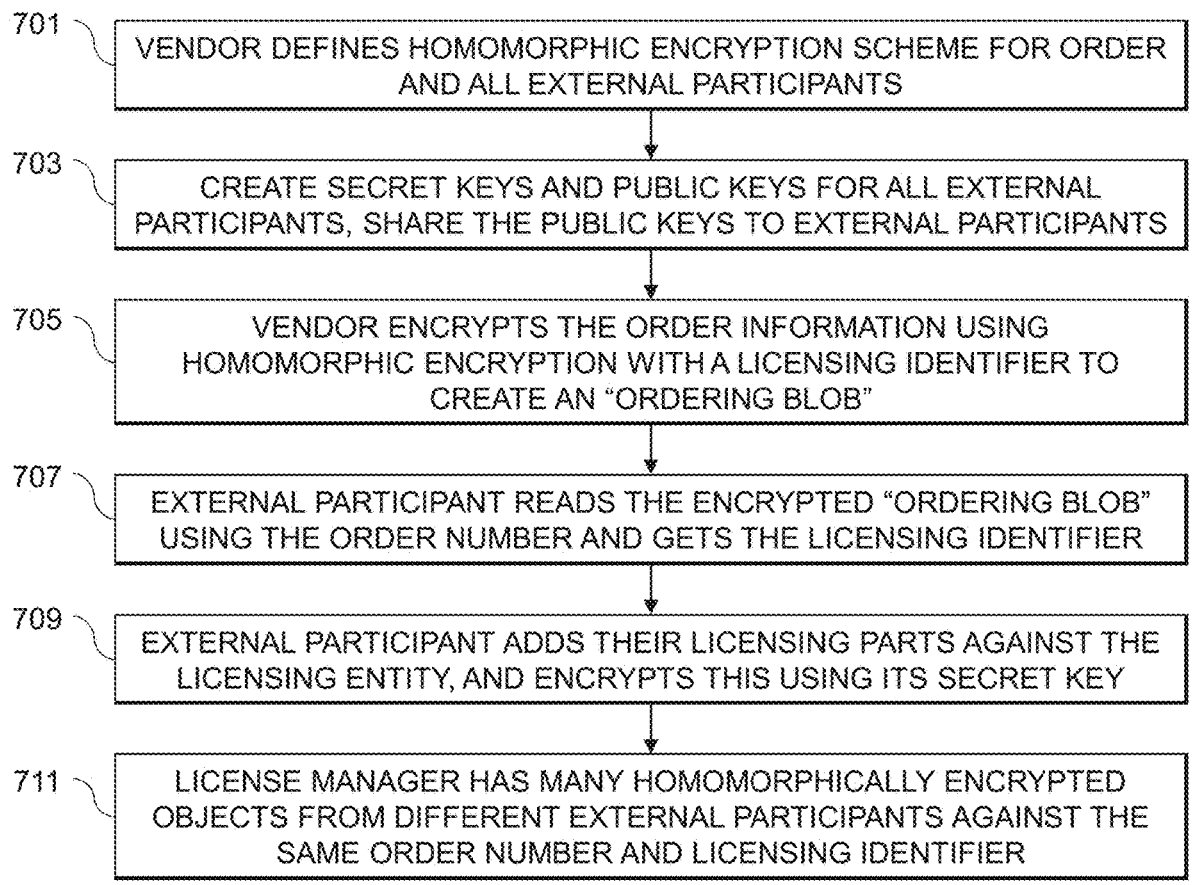
FIG. 7 shows a process flow for creating license objects utilizing homomorphic encryption in an illustrative embodiment.

FIG. 7 shows a process flow for license or access authorization object creation. The FIG. 7 process begins in step 701 with a vendor defining a homomorphic encryption scheme to be used for an order, where the homomorphic encryption scheme will be utilized by all external participants in the order process. In step 703, secret keys and public keys are created for all external participants in the order process, and the public keys are shared with the external participants. The vendor in step 705 encrypts the order information for an order, using the homomorphic encryption scheme defined in step 701, to create an encrypted access authorization object referred to as the "Ordering Blob." To do so, the vendor uses a unique number (e.g., a unique licensing identifier).

In step 707, an external participant reads the encrypted "Ordering Blob" using the order number for the order, and gets the licensing identifier. The external participant then adds their associated licensing parts against the licensing identifier in step 709, and encrypts the same using its associated secret key to produce an additional encrypted access authorization object (e.g., a "System Details Blob" produced by a factory or ODM participant in the order process, one or more "Software Keys Blobs" produced by one or more software vendor participants in the order process, etc.). It should be appreciated that multiple instances of steps 707 and 709 may be performed as part of an overall order process (e.g., each external participant in the order process may perform steps 707 and 709). In step 711, a license or key manager (e.g., which may be cloud-based) has multiple access authorization objects encrypted using the homomorphic encryption scheme defined in step 701, where such multiple access authorization objects may include the "Ordering Blob" produced by the vendor as well as one or more additional access authorization objects that are produced by external participants in the order process in different iterations of steps 707 and 709. Each encrypted access authorization object associated with a given order is associated with the same order number and licensing identifier.

Figure 8:
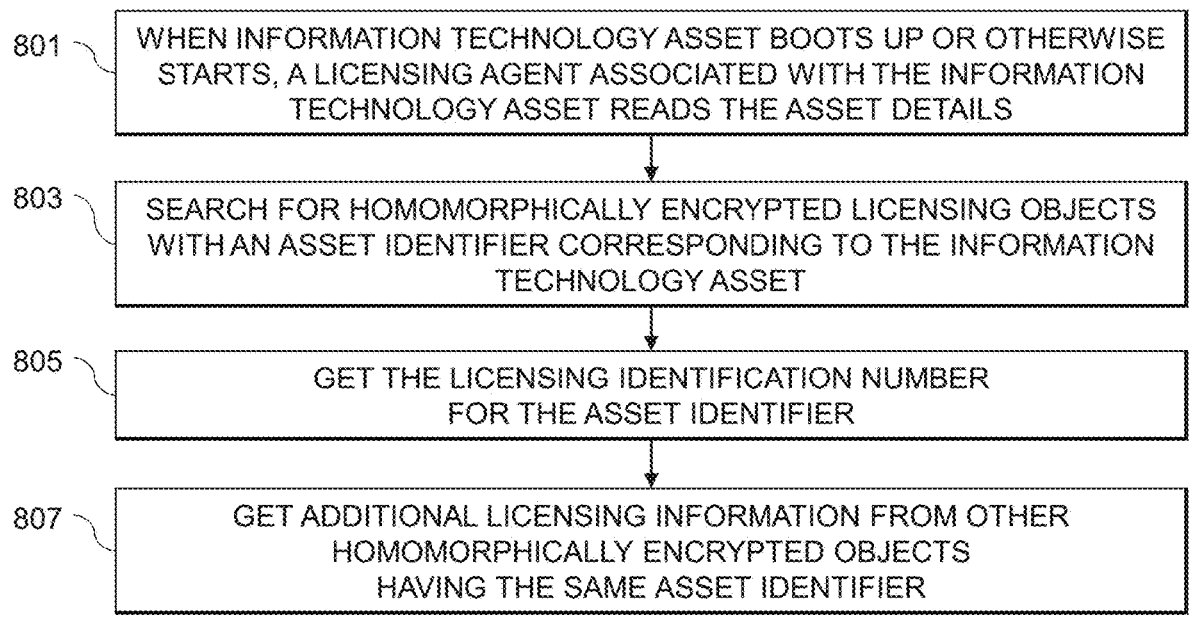
FIG. 8 shows a process flow for licensing enforcement using objects encrypted with a homomorphic encryption scheme in an illustrative embodiment.

FIG. 8 shows a process flow for licensing or access authorization enforcement using access authorization objects encrypted with a homomorphic encryption scheme. In step 801, when an IT asset boots up or otherwise starts (e.g., is launched, loaded, activated, powered on, accessed, woken up from a sleep or suspend state, etc.), a licensing agent associated with the IT asset reads that IT asset's details. The asset details, also referred to herein as machine details, are assumed to comprise a service tag or other type of asset identifier. In step 803, the licensing agent searches for homomorphically encrypted licensing or access authorization objects (e.g., "Manufacturing Blobs") for the asset identifier determined in step 801. In step 805, the licensing agent gets a license identification number for the asset identifier. The licensing agent in step 807 gets additional licensing information for the IT asset from other homomorphically encrypted access authorization objects having the same asset identifier and/or license identification number.

It should be appreciated that the different homomorphically encrypted access authorization objects from different external entities may be stored in any location that is accessible to licensing agents that run on or are otherwise associated with IT assets which use homomorphically encrypted access authorization objects for access control. For example, the different homomorphically encrypted access authorization objects may be stored by a license or access authorization manager that runs in a private or public cloud computing environment. As the homomorphically encrypted access authorization objects are separately encrypted by each different external participant, even if a hacker or other malicious actor is able to gain access to one of the homomorphically encrypted access authorization objects, this does not enable the hacker or other malicious actor to infer anything about the other homomorphically encrypted access authorization objects thus increasing the overall security.

Figure 9:
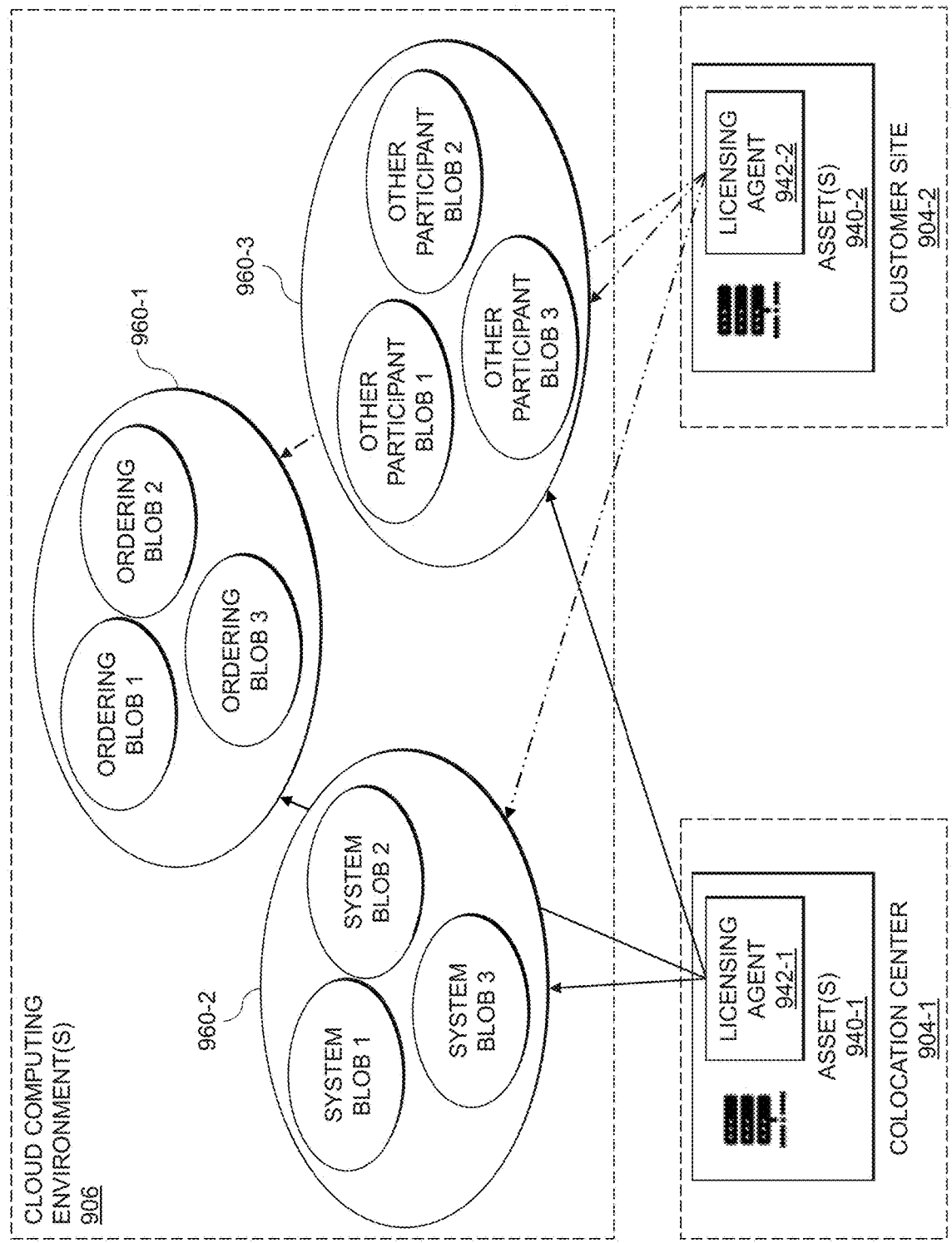
FIG. 9 shows a system of licensing agents reading different homomorphically encrypted objects from a cloud-based computing environment in an illustrative embodiment.

Licensing agents (e.g., Dell CLP) are configured to read data from the different homomorphically encrypted access authorization objects, and to accumulate such information to enforce access authorization control for different features and functionality of associated IT assets. FIG. 9 illustrates licensing agents reading different homomorphically encrypted access authorization objects from a cloud-based computing environment. The FIG. 9 system includes a colocation center 904-1 and a customer site 904-2, each of which is assumed to run one or more IT assets 940-1 and 940-2 (collectively, IT assets 940), with such IT assets 940-1 and 940-2 having associated licensing agents 942-1 and 942-2 (collectively, licensing agents 942) which are configured to access one or more cloud computing environments 906 at which different sets of homomorphically encrypted access authorization objects are stored. In the FIG. 9 examples, three sets of homomorphically encrypted access authorization objects 960-1, 960-2 and 960-3 (collectively, homomorphically encrypted access authorization objects 960) are shown, where homomorphically encrypted access authorization objects 960-1 include "Ordering Blobs," homomorphically encrypted access authorization objects 960-2 include "System Blobs," and homomorphically encrypted access authorization objects 960-3 include other "Participant Blobs."

In some embodiments, a homomorphic encryption algorithm is customized to create multiple keys for encrypting different licensing or other access authorization objects. For example, two sets of keys may be created and used with a given licensing or other access authorization object. A first set of keys (e.g., a first "common" public key shared amongst the participants) may be utilized by any participant in an ordering process to run a specified function (e.g., "Eval_LicenseID") in order to get the order number and licensing or other access authorization identifier from the given licensing or other access authorization object. All other information in the given licensing or other access authorization object is accessible using a second set of keys (e.g., a second "unique" private or secret key) that is made available to a limited set of participants. For example, the licensing or other access authorization agent for a given IT asset may have access to the second set of keys, such that it can decrypt and read information from the given licensing or other access authorization object.

Figure 10B:
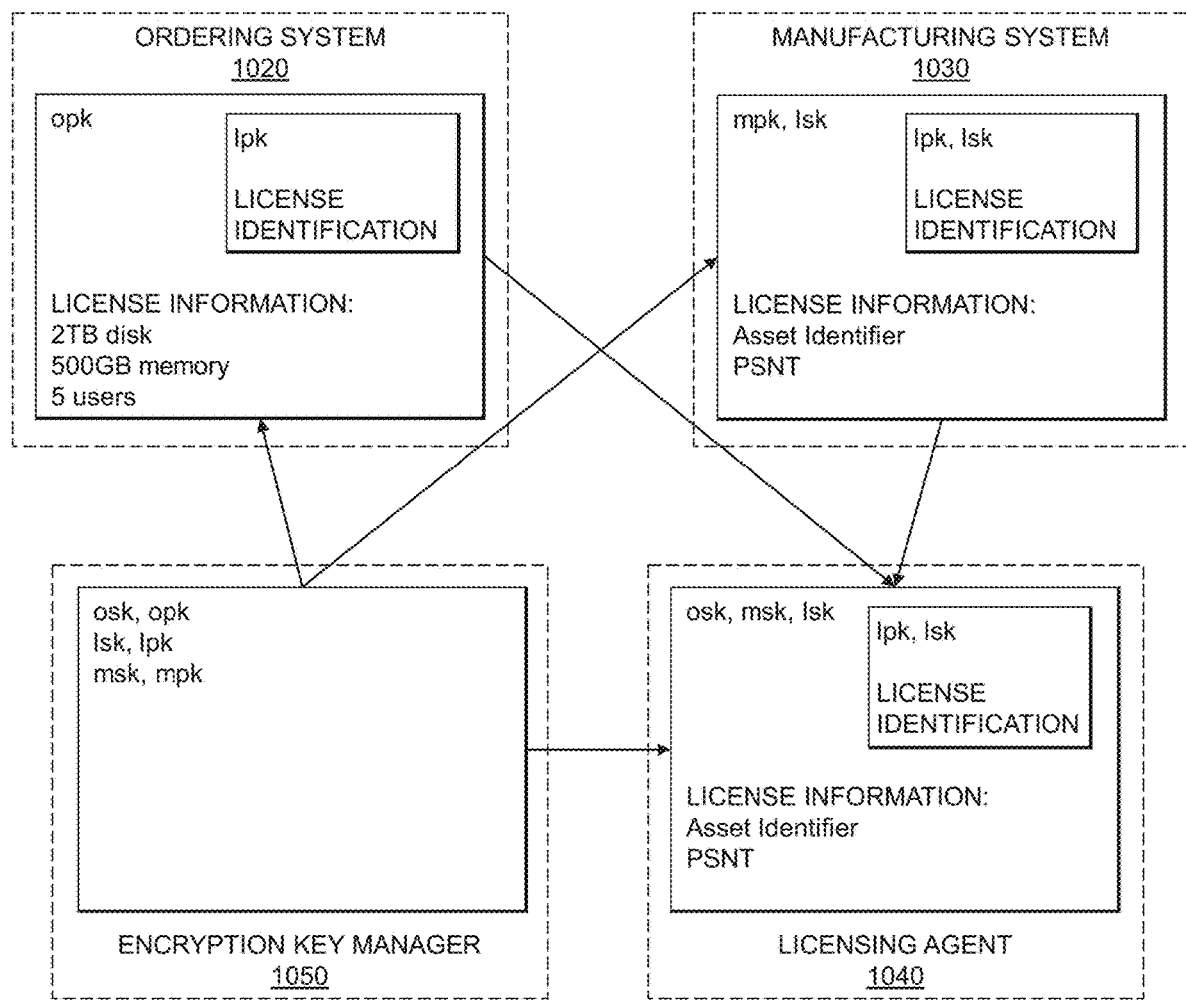

An encryption key manager is configured to generate sets of keys (e.g., homomorphic key pairs each including a public key and a private or secret key) for each participant in a license or other access authorization generation and enforcement process for IT assets. FIG. 10A shows a table 1000, illustrating different sets of the homomorphic secret and public key pairs for an example IT asset order process. Such key pairs include an order secret key (osk) and order public key (opk) pair, a license identification secret key (lsk) and a license identification public key (lpk), and a manufacturing secret key (msk) and a manufacturing public key (mpk). FIG. 10B illustrates sharing of these keys with different participants, including an ordering system 1020, a manufacturing system 1030, a licensing agent 1040, and an encryption key manager 1050.

The osk is shared with the licensing agent 1040, and is used for decrypting an "Ordering" homomorphically encrypted access authorization object (e.g., an "Ordering Blob"). The opk is shared with the ordering system 1020, and is used to encrypt ordering information held in the "Ordering Blob." The lsk and lpk are shared with all participants (e.g., the ordering system 1020, the manufacturing system 1030, the licensing agent 1040, and an encryption key manager 1050). The lsk is used to decrypt the license identification number in any of the homomorphically encrypted licensing or other access authorization objects (e.g., such as the "Ordering Blob," "System Blob," etc.). The lpk is used to encrypt the license identification number, as well as to execute a designated homomorphic encryption scheme function (e.g., an "Eval" function) to get cyphertext output. The msk is shared with the licensing agent 1040, and is used to decrypt system information in a "System" homomorphically encrypted object (e.g., a "System Blob"). The mpk is used by the manufacturing system 1030 to encrypt system information stored in the "System" homomorphically encrypted access authorization object (e.g., the "System Blob").

The encryption key manager 1050 generates and distributes the various sets of keys among the different participants (e.g., the ordering system 1020, the manufacturing system 1030 and the licensing agent 1040) as described above. Consider, as an example, creating of homomorphically encrypted licensing or other access authorization objects for an IT asset (e.g., a computing system) that is to be manufactured by an ODM (e.g., a manufacturing system 1030) on behalf of a vendor (e.g., operating the ordering system 1020). FIG. 11 shows an example of an "Ordering" object 1100 (e.g., an "Ordering Blob"), which the ordering system 1020 generates in a plaintext JavaScript Object Notation (JSON) format, and which contains order information for an IT asset: an Order Number (e.g., "123456"), a License Identification Number (e.g., "987654321"), a product type for the IT asset, 5 users, 500 GB of memory, and 2 TB of disk or storage. FIG. 11 also shows an example of the "Ordering" object 1100 following application of homomorphic encryption using lpk. The resulting object 1105 is shown, where a designated homomorphic function (e.g., "Eval") takes the "Order Number" as encrypted and gives back the "License Identification Number" in an encrypted format. Using lsk, which is shared with all participants, any of the participants can decrypt and obtain the "License Identification Number." The other information in the "Ordering" object 1100, however, cannot be accessed and decrypted by any participant except the licensing agent 1040 (e.g., or any participant with access to the osk).

Figure 12:
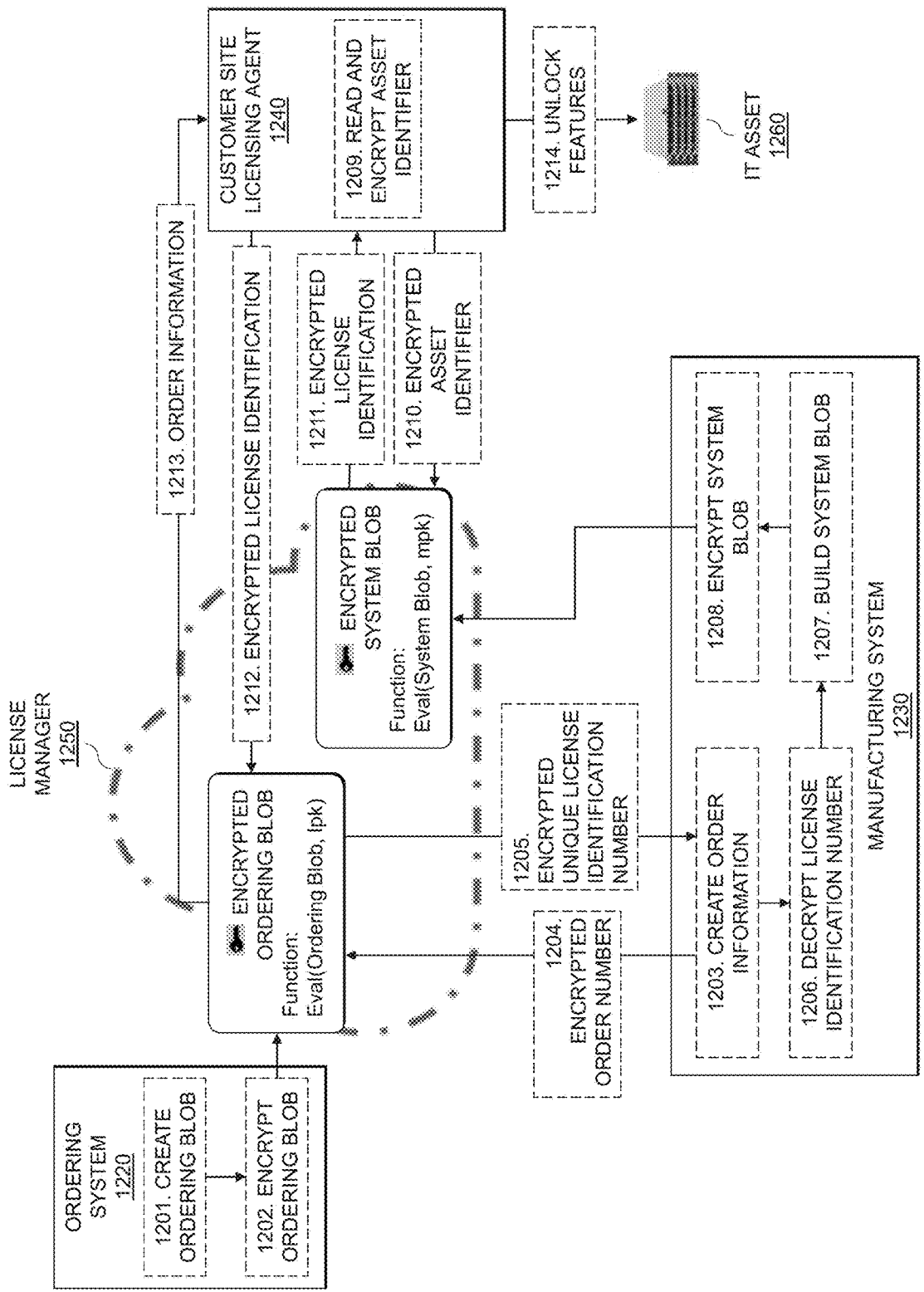
FIG. 12 shows a system flow for creating of homomorphically encrypted objects as part of an ordering process for an information technology asset in an illustrative embodiment.

FIG. 12 illustrates creation and distribution of homomorphically encrypted access authorization objects among participants such as an ordering system 1220, a manufacturing system 1230 and a customer site licensing agent 1240, and a license manager 1250. In the homomorphic encryption scheme utilized in this example, a designated function "Eval" takes the encrypted "Order Number" and lpk as input and gives back the "License Identification Number" in an encrypted format. Using lsk, any participant (e.g., the ordering system 1220, the manufacturing system 1230, the licensing agent 1240, or the license manager 1250) can decrypt the encrypted "License Identification Number." Other information in the homomorphically encrypted access authorization objects (e.g., the "Ordering Blob" and the "System Blob") cannot be accessed and decrypted by any participant lacking another key (e.g., the osk for the "Ordering Blob" and the msk for the "System Blob").

In the FIG. 12 example, the ordering system 1220 in step 1201 creates an access authorization object containing ordering information (e.g., "Order Info"), with this access authorization object being referred to as the "Ordering Blob." In step 1202, the ordering system 1220 encrypts the "Ordering Blob" for storage by the license manager 1250 as the "Encrypted Ordering Blob." The license manager 1250, as described elsewhere herein, may be implemented in a cloud computing environment or other type of data store or system that is accessible to the various participants (e.g., the ordering system 1220, the manufacturing system 1230, and the licensing agent 1240). Using the homomorphic encryption scheme, a designated function "Eval" can be evaluated by passing the lpk and the order number to get the "License Identification Number" in cyphertext.

The manufacturing system 1230 in step 1203 creates order information for an IT asset, and in step 1204 passes the encrypted order number to the "Encrypted Ordering Blob" which in step 1205 returns the encrypted unique "License Identification Number." The encrypted "License Identification Number" is decrypted by the manufacturing system 1230 in step 1206 using lsk to get the "License Identification Number" in plaintext. The manufacturing system 1230 in step 1207 encrypts system information to build another access authorization object, a "System Blob." The system information may include, for example, a service tag or other types of IT asset identifier, a PSNT, etc. In step 1208, the manufacturing system 1230 utilizes mpk to generate a homomorphically encrypted system information access authorization object, referred to as the "Encrypted System Blob." The "Encrypted System Blob" is pushed to the license manager 1250. The "Eval" function when applied against the "Encrypted System Blob" takes the asset identifier and gives back the "License Identification Number."

Once the IT asset is booted or otherwise started at the customer site, the licensing agent 1240 in step 1209 will read the asset identifier of the IT asset 1260. In step 1210, the asset identifier is encrypted and passed to the "Encrypted System Blob" to search for the asset identifier and get back the "License Identification Number" in encrypted form in step 1211. If the "License Identification Number" is received (e.g., by executing the "Eval" function in the Encrypted System Blob using lpk and then decrypting the output using lsk to get the "License Identification Number"), the asset identifier of the IT asset 1260 is assumed to be associated with a valid purchase or order. The licensing agent 1240 in step 1212 will then execute the "Eval" function in the "Encrypted Ordering Blob" by passing the encrypted "License Identification Number" and opk to get the order information in encrypted form in response in step 1213. The licensing agent 1240 then decrypts the order information cyphertext using osk. In step 1214, the licensing agent unlocks features of the IT asset 1260, and features of the IT asset 1260 may be utilized.

It should be appreciated that more homomorphically encrypted access authorization objects (e.g., encrypted blobs) can be added for other participants that are involved in licensing or access authorization for the IT asset 1260. Examples of such other participants include external entities that license software that will run on the IT asset 1260 (e.g., office software, virtualization software, etc.). Each external entity will read the "License Identification Number" against the order number for the IT asset 1260 to create its own access authorization object (e.g., an "External Entity Blob") which will be encrypted using its own set of homomorphic encryption keys against the "License Identification Number." Such homomorphically encrypted access authorization objects will be encrypted with public homomorphic encryption keys suppled to such external entities (e.g., by the license manager 1250). The licensing agent 1240 associated with the IT asset 1260 will read such homomorphically encrypted access authorization objects and apply designated homomorphic functions (e.g., "Eval" functions) without requiring decryption of the homomorphically encrypted access authorization objects.

Various types of homomorphic encryption algorithms may be adapted for use in different embodiments. An example implementation will now be described with respect to adapting a PALISADE homomorphic encryption software library. First, a secret key is generated for use by the ordering system 1220, and the licensing agent 1240 associated with the IT asset 1260 for whole license key or other access authorization information encryption and decryption of designated homomorphic encryption functions (e.g., encryption and decryption of "Eval" returns). A secret key is then generated for the manufacturing system 1230 that will manufacture the IT asset 1260. This secret key is utilizable by the manufacturing system 1230 only for decrypting a "License Identification Number." The encryption is then parameterized to have the designated function (e.g., "Eval") return the "License Identification Number" as cyphertext from a homomorphically encrypted order information object (e.g., the "Encrypted Ordering Blob").

FIG. 13A shows pseudocode 1300 for the above functionality. The key used for the EvalIdentificationID" function is then created as shown in the pseudocode 1305 shown in FIG. 13B. This key will be shared with the manufacturing system 1230. The "License Identification Number" is obtained as cyphertext from the homomorphically encrypted order information object (e.g., the "Encrypted Ordering Blob") using the public key, as illustrated in the pseudocode 1310 shown in FIG. 13B. The "License Identification Number" cyphertext is then decrypted using the secret key, as shown in the pseudocode 1315 shown in FIG. 13B. The manufacturing system 1230 can then create the system information object, which is then homomorphically encrypted to produce a homomorphically encrypted system information object (e.g., the "Encrypted System Blob").

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for access authorization utilizing homomorphically encrypted access authorization objects will now be described in greater detail with reference to FIGS. 14 and 15. Although described in the context of system 100, these platforms may also be used to implement at least portions of other information processing systems in other embodiments.

Figure 14:
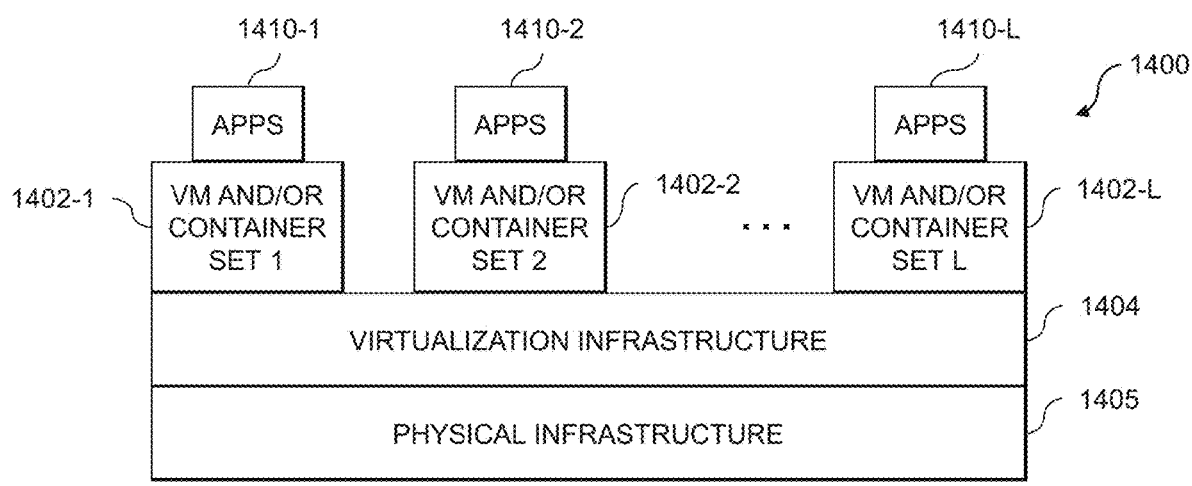
FIGS. 14 and 15 show examples of processing platforms that may be utilized to implement at least a portion of an information processing system in illustrative embodiments.
Figure 15:
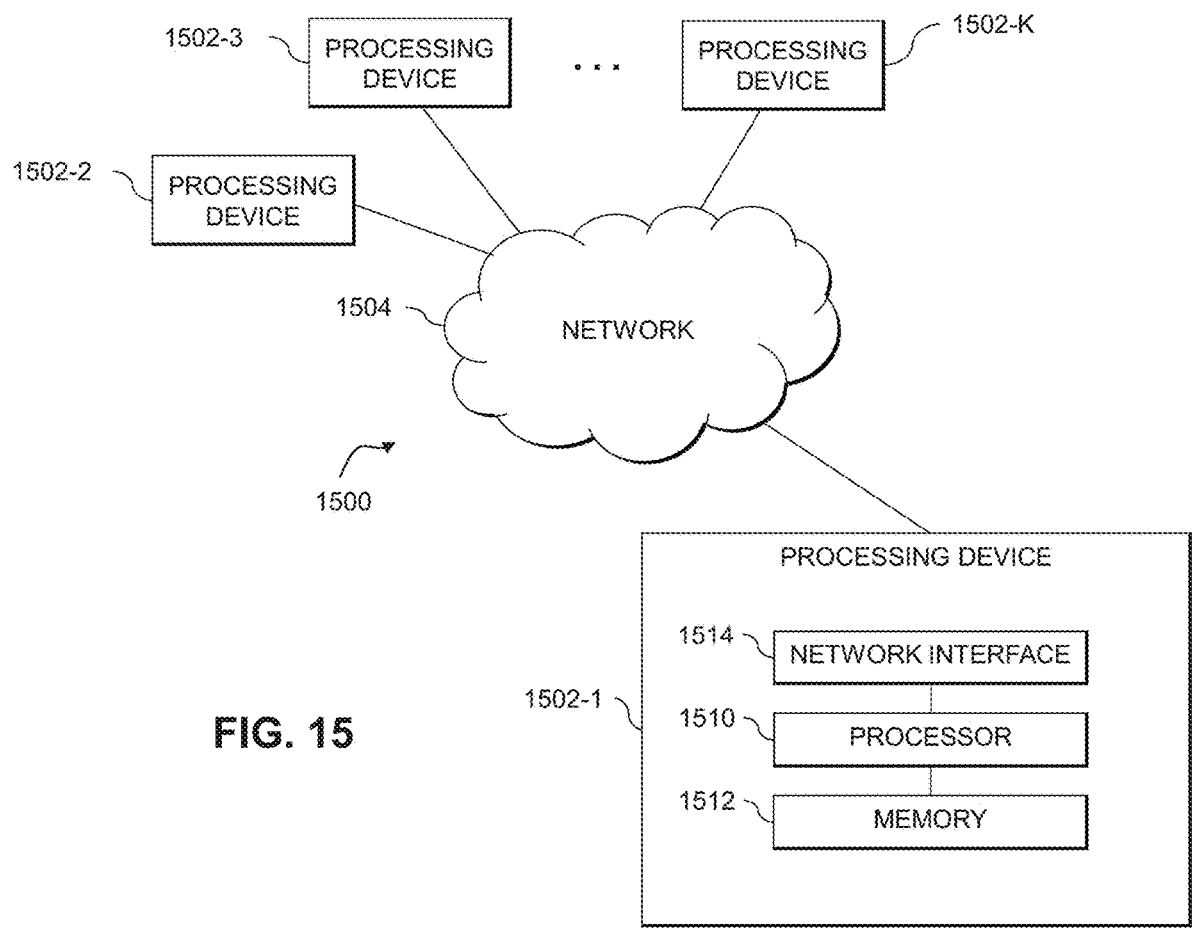

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, ... 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, ... 1410-L running on respective ones of the VMs/container sets 1402-1, 1402-2, ... 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, ... 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for access authorization utilizing homomorphically encrypted access authorization objects as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, services, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        determining an asset identifier for an information technology asset;
        encrypting the asset identifier utilizing a homomorphic encryption public key of a first homomorphic encryption key pair;
        evaluating a first homomorphic encryption function for a first one of a set of two or more homomorphically encrypted access authorization objects, the first homomorphic encryption function taking as input the encrypted asset identifier and providing as output an encrypted access authorization identifier associated with the information technology asset;
        decrypting the encrypted access authorization identifier utilizing a homomorphic encryption secret key of the first homomorphic encryption key pair;
        responsive to validating the decrypted access authorization identifier, evaluating one or more additional homomorphic encryption functions for one or more additional ones of the set of two or more homomorphically encrypted access authorization objects, a given one of the one or more additional homomorphic encryption functions taking as input the access authorization identifier encrypted utilizing a given homomorphic encryption public key of a given additional homomorphic encryption key pair and providing as output encrypted access authorization information for at least a given portion of functionality of the information technology asset;
        decrypting the encrypted access authorization information utilizing a given homomorphic encryption secret key of the given additional homomorphic encryption key pair; and
        responsive to validating the decrypted access authorization information, authorizing access to the given portion of the functionality of the information technology asset.

2. The apparatus of claim 1 wherein the first homomorphic encryption key pair is shared with access authorization participants generating the set of two or more homomorphically encrypted access authorization objects.

3. The apparatus of claim 1 wherein the given additional homomorphically encrypted access authorization object is homomorphically encrypted by a given access authorization participant utilizing the given homomorphic encryption public key of the given additional homomorphic encryption key pair.

4. The apparatus of claim 3 wherein the given homomorphic encryption secret key of the given additional homomorphic encryption key pair is not provided to the given access authorization participant.

5. The apparatus of claim 1 wherein the at least one processing device comprises an access authorization agent associated with the information technology asset, and wherein the first and one or more additional homomorphically encrypted access authorization objects are stored in a storage system external to the at least one processing device.

6. The apparatus of claim 5 wherein the storage system external to the at least one processing device comprises a cloud-based computing platform.

7. The apparatus of claim 1 wherein the information technology asset runs in a colocation data center operated by an entity, and wherein the set of two or more homomorphically encrypted access authorization objects are utilized for authorizing access to the information technology asset running in the colocation data center by one or more end-users operating outside of the colocation data center.

8. The apparatus of claim 1 wherein the first homomorphically encrypted access authorization object is generated by a first access authorization participant that manufactures the information technology asset on behalf of a second access authorization participant.

9. The apparatus of claim 8 wherein the first homomorphically encrypted access authorization object stores system details of the information technology asset manufactured by the first access authorization participant.

10. The apparatus of claim 8 wherein the given additional homomorphically encrypted access authorization object is generated by the second access authorization participant.

11. The apparatus of claim 10 wherein the second access authorization participant comprises a vendor that receives an order for the information technology asset, and the access authorization information stored in the given additional homomorphically encrypted access authorization object comprises order information specifying functionality to be provided by the information technology asset.

12. The apparatus of claim 1 wherein the access authorization information stored in the given additional homomorphically encrypted access authorization object comprises a designated number of users permitted to concurrently access the information technology asset, and wherein authorizing access to the given portion of the functionality of the information technology asset comprises limiting a number of users concurrently accessing the information technology asset to the designated number of users.

13. The apparatus of claim 1 wherein the access authorization information stored in the given additional homomorphically encrypted access authorization object specifies designated amounts of one or more compute, storage, memory and network resources of the information technology asset that are permitted to be accessed by one or more designated users, and wherein authorizing access to the given portion of the functionality of the information technology asset comprises permitting the one or more designated users to access the designated amounts of the one or more compute, storage, memory and network resources of the information technology asset.

14. The apparatus of claim 1 wherein the access authorization information stored in the given additional homomorphically encrypted access authorization object specifies one or more designated portions of functionality of one or more pieces of software installed on the information technology asset that are permitted to be accessed by one or more designated users, and wherein authorizing access to the given portion of the functionality of the information technology asset comprises permitting the one or more designated users to access the one or more designated portions of the functionality of the one or more pieces of software.

15. A computer program product comprising a non-transitory processor-readable storage medium having stored therein program code of one or more software programs, wherein the program code when executed by at least one processing device causes the at least one processing device to perform steps of:

determining an asset identifier for an information technology asset;

encrypting the asset identifier utilizing a homomorphic encryption public key of a first homomorphic encryption key pair;

evaluating a first homomorphic encryption function for a first one of a set of two or more homomorphically encrypted access authorization objects, the first homomorphic encryption function taking as input the encrypted asset identifier and providing as output an encrypted access authorization identifier associated with the information technology asset;

decrypting the encrypted access authorization identifier utilizing a homomorphic encryption secret key of the first homomorphic encryption key pair;

responsive to validating the decrypted access authorization identifier, evaluating one or more additional homomorphic encryption functions for one or more additional ones of the set of two or more homomorphically encrypted access authorization objects, a given one of the one or more additional homomorphic encryption functions taking as input the access authorization identifier encrypted utilizing a given homomorphic encryption public key of a given additional homomorphic encryption key pair and providing as output encrypted access authorization information for at least a given portion of functionality of the information technology asset;

decrypting the encrypted access authorization information utilizing a given homomorphic encryption secret key of the given additional homomorphic encryption key pair; and responsive to validating the decrypted access authorization information, authorizing access to the given portion of the functionality of the information technology asset.

16. The computer program product of claim 15 wherein the access authorization information stored in the given additional homomorphically encrypted access authorization object comprises a designated number of users permitted to concurrently access the information technology asset, and wherein authorizing access to the given portion of the functionality of the information technology asset comprises limiting a number of users concurrently accessing the information technology asset to the designated number of users.

17. The computer program product of claim 15 wherein the access authorization information stored in the given additional homomorphically encrypted access authorization object specifies designated amounts of one or more compute, storage, memory and network resources of the information technology asset that are permitted to be accessed by one or more designated users, and wherein authorizing access to the given portion of the functionality of the information technology asset comprises permitted the one or more designated users to access the designated amounts of the one or more compute, storage, memory and network resources of the information technology asset.

18. A method comprising:

determining an asset identifier for an information technology asset;

encrypting the asset identifier utilizing a homomorphic encryption public key of a first homomorphic encryption key pair;

evaluating a first homomorphic encryption function for a first one of a set of two or more homomorphically encrypted access authorization objects, the first homomorphic encryption function taking as input the encrypted asset identifier and providing as output an encrypted access authorization identifier associated with the information technology asset;

decrypting the encrypted access authorization identifier utilizing a homomorphic encryption secret key of the first homomorphic encryption key pair;

responsive to validating the decrypted access authorization identifier, evaluating one or more additional homomorphic encryption functions for one or more additional ones of the set of two or more homomorphically encrypted access authorization objects, a given one of the one or more additional homomorphic encryption functions taking as input the access authorization identifier encrypted utilizing a given homomorphic encryption public key of a given additional homomorphic encryption key pair and providing as output encrypted access authorization information for at least a given portion of functionality of the information technology asset;

decrypting the encrypted access authorization information utilizing a given homomorphic encryption secret key of the given additional homomorphic encryption key pair; and responsive to validating the decrypted access authorization information, authorizing access to the given portion of the functionality of the information technology asset wherein the method is performed by at least one processing device comprising a processor coupled to a memory.

19. The method of claim 18 wherein the access authorization information stored in the given additional homomorphically encrypted access authorization object comprises a designated number of users permitted to concurrently access the information technology asset, and wherein authorizing access to the given portion of the functionality of the information technology asset comprises limiting a number of users concurrently accessing the information technology asset to the designated number of users.

20. The method of claim 18 wherein the access authorization information stored in the given additional homomorphically encrypted access authorization object specifies designated amounts of one or more compute, storage, memory and network resources of the information technology asset that are permitted to be accessed by one or more designated users, and wherein authorizing access to the given portion of the functionality of the information technology asset comprises permitted the one or more designated users to access the designated amounts of the one or more compute, storage, memory and network resources of the information technology asset.

* * * * *